US012605629B2

(12) United States Patent
Gao et al.

(10) Patent No.: US 12,605,629 B2
(45) Date of Patent: Apr. 21, 2026

(54) INTERACTION PROCESSING METHOD AND APPARATUS FOR VIRTUAL SCENE, ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Hao Gao, Shenzhen (CN); Lin Lin, Shenzhen (CN); Shanshan Qian, Shenzhen (CN); Haohui Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 280 days.

(21) Appl. No.: 18/216,491

(22) Filed: Jun. 29, 2023

(65) Prior Publication Data

US 2023/0338846 A1      Oct. 26, 2023

Related U.S. Application Data

(63) Continuation of application No. PCT/CN2022/126326, filed on Oct. 20, 2022.

(30) Foreign Application Priority Data

Nov. 18, 2021      (CN) .......................... 202111367209.8
Dec. 31, 2021      (CN) .......................... 202111666803.7

(51) Int. Cl.
*A63F 13/533*       (2014.01)
*A63F 13/58*        (2014.01)

(52) U.S. Cl.
CPC ............. *A63F 13/533* (2014.09); *A63F 13/58* (2014.09)

(58) Field of Classification Search
CPC ........ A63F 13/25; A63F 13/45; A63F 13/533; A63F 13/537; A63F 13/5372;
(Continued)

(56) References Cited

U.S. PATENT DOCUMENTS 10,083,051 B1       9/2018   Mahapatra et al.
11,135,516 B1 *   10/2021   Koch ...................... A63F 13/79
(Continued)

FOREIGN PATENT DOCUMENTS

CN         110102052 A      8/2019
CN         111625353 A      9/2020
(Continued)

OTHER PUBLICATIONS

Jiaochengzhijia.com, "Genting Game Card Recorder v10.24", last updated Apr. 2021, Retrieved from the Internet: https://www.jiaochengzhijia.com/down/13223.html.
(Continued)

*Primary Examiner* — Omkar A Deodhar
(74) *Attorney, Agent, or Firm* — Morgan, Lewis & Bockius LLP

(57)      ABSTRACT

Provided are an interaction processing method and apparatus for a virtual scene, an electronic device, a non-transitory computer-readable storage medium, and a computer program product. The method includes: displaying a virtual scene, the virtual scene including identifiers of a plurality of accounts, and each account being capable of using at least one virtual object to interact with at least one virtual object used by another account; displaying a counter button; and in response to a trigger operation on the counter button, displaying a counter control comprising a number of virtual (Continued)

objects of each type that have been used and a total number of virtual objects of the type that are allowed to be used.

20 Claims, 19 Drawing Sheets

(58) Field of Classification Search
CPC .......... A63F 13/55; A63F 13/56; A63F 13/58;
A63F 13/70; A63F 13/77; A63F 13/79;
A63F 13/798; A63F 2300/208; A63F
2300/303; A63F 2300/306; A63F
2300/5533; A63F 2300/554; A63F
2300/556
See application file for complete search history.

(56) References Cited

U.S. PATENT DOCUMENTS

| | | | | |
|---|---|---|---|---|
| 2011/0055919 | A1* | 3/2011 | Hamilton, II | G06F 21/10 |
| | | | | 715/757 |
| 2015/0273320 | A1* | 10/2015 | Pieron | A63F 13/79 |
| | | | | 463/25 |
| 2017/0006462 | A1 | 1/2017 | Dorris et al. | |
| 2020/0020205 | A1 | 1/2020 | Moskowitz | |
| 2022/0358450 | A1* | 11/2022 | Stephens | A63F 13/79 |
| 2023/0024836 | A1* | 1/2023 | Bennett | G06N 20/00 |

FOREIGN PATENT DOCUMENTS

| | | | |
|---|---|---|---|
| CN | 111701240 | A | 9/2020 |
| CN | 112870702 | A | 6/2021 |
| CN | 113171605 | A | 7/2021 |
| CN | 113230650 | A | 8/2021 |
| CN | 113486036 | A | 10/2021 |
| CN | 114307152 | A | 4/2022 |
| JP | 2017055898 | A | 3/2017 |
| JP | 2018164586 | A | 10/2018 |
| JP | 2021013573 | A | 2/2021 |

OTHER PUBLICATIONS

Qqtn.com., "Little Golden Donkey Auto-Chess Assistant v1.0.2.4", last updated Jul. 2019, Retrieved from the Internet: https://www.gotn.com/gamefz/440159.html.

Tencent Technology, WO, PCT/CN2022/126326, Jan. 11, 2023, 4 pgs.

Tencent Technology, IPRP, PCT/CN2022/126326, May 2, 2024, 5 pgs.

Tencent Technology, Japanese Office Action, JP Patent Application No. 2024-510629, Apr. 11, 2025, 13 pgs.

Tencent Technology, ISR, PCT/CN2022/126326, Jan. 11, 2023, 3 pgs.

* cited by examiner

```
┌─────────────────────────────────────────────────┐
│              Display a virtual scene             │── 101
└─────────────────────────────────────────────────┘
                         │
                         ▼
┌─────────────────────────────────────────────────┐
│             Display a counter button             │── 102
└─────────────────────────────────────────────────┘
                         │
                         ▼
┌─────────────────────────────────────────────────┐
│ Display a counter control in response to a       │── 103
│ trigger operation for the counter button         │
└─────────────────────────────────────────────────┘
                         │
                         ▼
┌─────────────────────────────────────────────────┐
│ Display detailed information about any type of   │── 105
│ virtual object in response to a trigger          │
│ operation for any type of virtual object         │
│ displayed in the counter control                 │
└─────────────────────────────────────────────────┘
```

FIG. 8

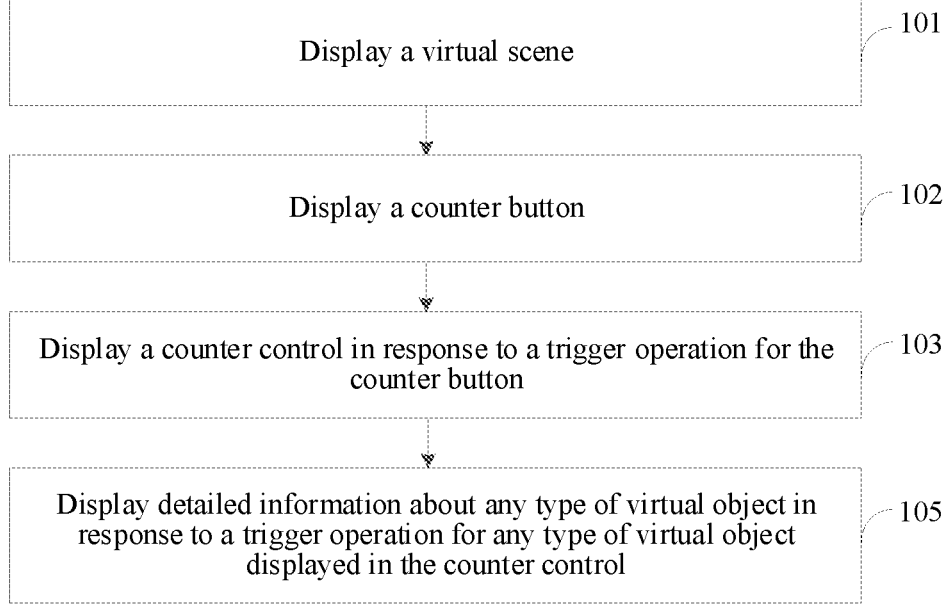

FIG. 9A

INTERACTION PROCESSING METHOD AND APPARATUS FOR VIRTUAL SCENE, ELECTRONIC DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2022/126326, entitled "INTERACTION PROCESSING METHOD AND APPARATUS FOR VIRTUAL SCENE, ELECTRONIC DEVICE, COMPUTER-READABLE STORAGE MEDIUM, AND COMPUTER PROGRAM PRODUCT" filed on Oct. 20, 2022, which claims priority to Chinese Patent Application No. 202111367209.8, entitled "VIRTUAL SCENE DISPLAY METHOD AND DEVICE, ELECTRONIC EQUIPMENT AND STORAGE MEDIUM" filed on Nov. 18, 2021 and Chinese Patent Application No. 202111666803.7, entitled "VIRTUAL SCENE DISPLAY METHOD AND DEVICE, ELECTRONIC EQUIPMENT AND STORAGE MEDIUM" filed on Dec. 31, 2021, all of which are incorporated by reference in their entireties.

FIELD OF THE TECHNOLOGY

This application relates to the field of human-computer interaction technologies, and in particular, to an interaction processing method and apparatus for a virtual scene, an electronic device, a non-transitory computer-readable storage medium, and a computer program product.

BACKGROUND OF THE DISCLOSURE

The display technology based on graphics processing hardware extends the channels for perceiving the environment and acquiring information, especially the virtual scene display technology, which can realize diversified interactions between virtual objects controlled by users or artificial intelligence according to actual application requirements, and has various typical application scenario. For example, in a virtual scene of a game, the virtual scene display technology can simulate a real battle between virtual objects.

With the popularity of information technology, electronic devices may implement richer and more vivid virtual scenes, typically, such as a game. More and more users participate in interactions in virtual scenes through electronic devices. For example, in a game, a user may use a virtual object to fight against virtual objects used by other users.

However, in the related technologies, acquisition of information about types and number of virtual objects that have been used in a game is tedious. For example, a user needs to enter an information page of each other user, check types and number of virtual objects that have been used by each other user, and manually remember and calculate to finally obtain the number of virtual objects of each type that have been currently used in a game. Such a method will undoubtedly result in unnecessary waiting and resource consumption of a server, and will also cause a latency in game processing.

SUMMARY

Embodiments of this application provide an interaction processing method and apparatus for a virtual scene, an electronic device, a non-transitory computer-readable storage medium, and a computer program product, which can accelerate an interaction process in a virtual scene, and reduce the waiting time and resource consumption of a server.

Technical solutions in the embodiments of this application are implemented as follows:

The embodiments of this application provide an interaction processing method for a virtual scene, which is performed by an electronic device and includes:

displaying a virtual scene, the virtual scene including identifiers of a plurality of accounts, and each account being capable of controlling at least one virtual object to interact with at least one virtual object controlled by another account;

displaying a counter button; and in response to a trigger operation on the counter button, displaying a counter control comprising a number of virtual objects of each type that have been used and a total number of virtual objects of the type that are allowed to be used.

The embodiments of this application provide an electronic device, which includes:

a memory, configured to store an executable instruction; and a processor, configured to execute the executable instruction stored in the memory to implement the interaction processing method for a virtual scene according to the embodiments of this application.

The embodiments of this application provide a non-transitory computer-readable storage medium, which stores an executable instruction that, when executed by a processor, implements the interaction processing method for a virtual scene according to the embodiments of this application.

The embodiments of this application provide a computer program product, which includes a computer program or instruction that, when executed by a processor, implements the interaction processing method for a virtual scene according to the embodiments of this application.

The embodiments of this application have the following beneficial effects:

The display of the counter control is triggered by displaying the counter button, and the number of virtual objects of each type that have been used and the total number of virtual objects of each type that are allowed to be used are prompted through the counter control, so that a user may integrally perceive the number of virtual objects of each type that have been currently used and the total number of virtual objects of each type that are allowed to be used in a virtual scene at one time. Compared with the method of entering an information page of each user, checking, and manually remembering and calculating in the related technologies, the method of this application significantly reduces the user's operation and decision-making time, accelerates an interaction process in a virtual scene, and reduce the waiting time and resource consumption of a server.

BRIEF DESCRIPTION OF THE DRAWINGS

FIG. 8 is a schematic flowchart of an interaction processing method for a virtual scene according to an embodiment of this application.

FIG. 9A to FIG. 9C are schematic diagrams of application scenarios of an interaction processing method for a virtual scene according to embodiments of this application.

DESCRIPTION OF EMBODIMENTS

Figure 1:
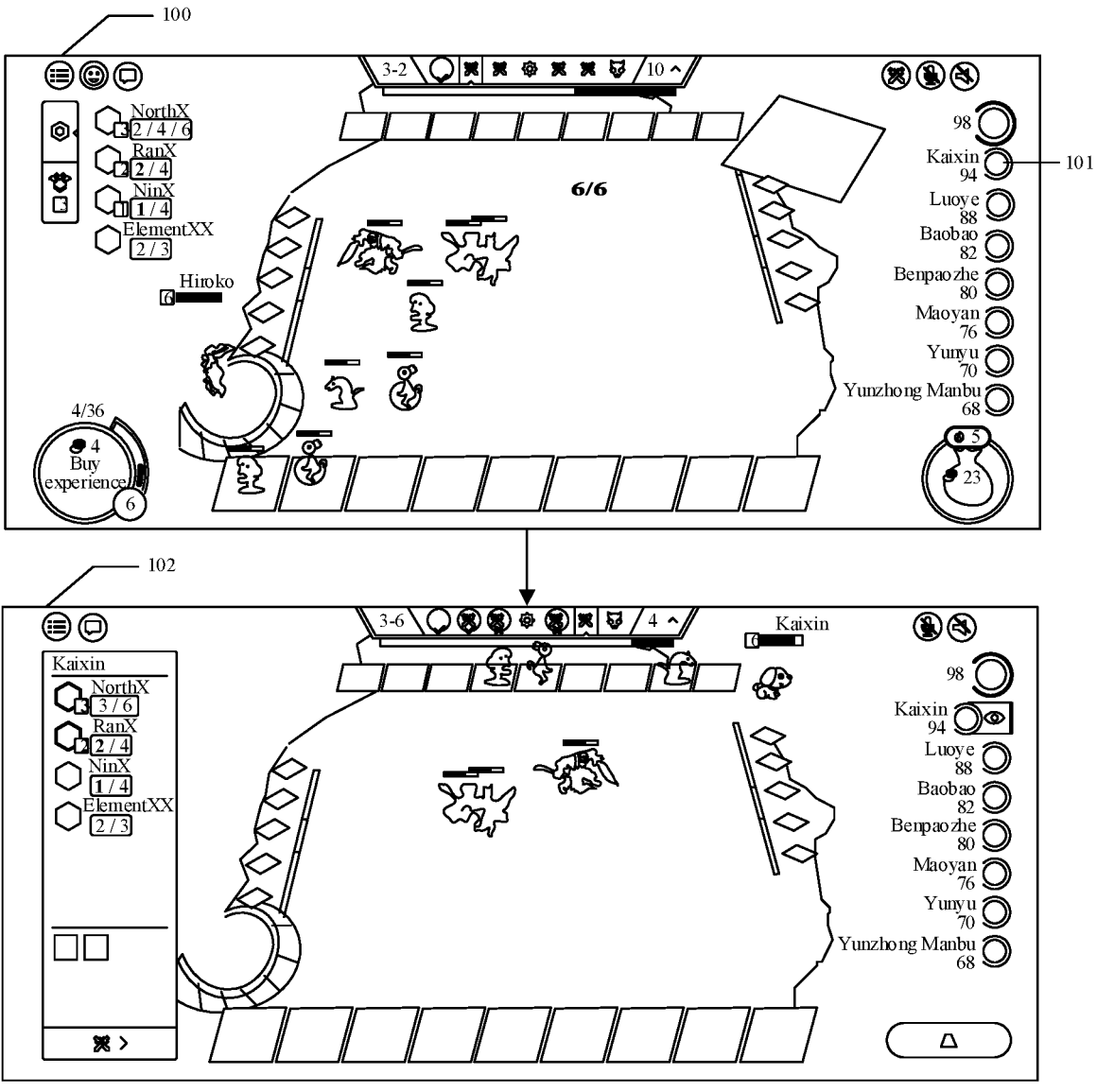
FIG. 1 is a schematic diagram of an application scenario of an interaction processing method for a virtual scene according to the related technology.

In order to make the objectives, technical solutions, and advantages of this application clearer, this application will be further described in detail below with reference to the drawings, and the described embodiments shall not be considered as limiting this application. All other embodiments obtained by those of ordinary skill in the art without involving any inventive effort shall fall within the scope of protection of this application.

In the following description, "some embodiments" involved are used to describe a subset of all possible embodiments. It will be appreciated that "some embodiments" may be the same subset or different subsets of all possible embodiments, and may be combined with each other without conflict.

In the following description, the term "a plurality of" involved means at least two.

Unless otherwise defined, all technical and scientific terms used herein have the same meanings as commonly understood by those skilled in the art to which this application belongs. The terms used herein are only for the purpose of describing the embodiments of this application, and are not intended to limit this application.

Before the embodiments of this application are further described in detail, the nouns and terms involved in the embodiments of this application are described, and the nouns and terms involved in the embodiments of this application are applicable to the following explanations.

1) In response to: it is used to indicate a condition or state on which an operation to be performed depends. When the dependent condition or state is satisfied, one or more operations to be performed may be real-time or have a set latency. Unless otherwise specified, there is no limitation to the order in which a plurality of operations are performed.

2) Virtual scene: it is a scene displayed (or provided) when an application program runs on a terminal device. The scene may be a simulated environment of the real world, a semi-simulated and semi-fictional virtual environment or a purely fictional virtual environment. The virtual scene may be any one of a two-dimensional virtual scene, a 2.5-dimensional virtual scene or a three-dimensional virtual scene, and the dimension of the virtual scene is not defined in the embodiments of this application. For example, the virtual scene may include a sky, a land, an ocean, and the like. The land may include an environmental element such as a desert and a city, and a user may control a virtual object to move within the virtual scene.

3) Virtual object: it is an image of people or a thing that may interact in a virtual scene, or a movable object in a virtual scene. The movable object may be a virtual character, a virtual animal, a cartoon character, or the like, such as a character and an animal displayed in a virtual scene. The virtual object may be a virtual image used for representing a user in a virtual scene. A virtual scene may include a plurality of virtual objects, and each virtual object has its own shape and volume in the virtual scene, and occupies part of the space in the virtual scene.

4) Scene data: it is feature data used for representing a virtual scene, for example, may be the area of a construction area in the virtual scene, and a current architectural style of the virtual scene. It may also include a position of a virtual building in the virtual scene, the floor area of the virtual building, and the like.

5) Client: it is an application program running in a terminal device and configured to provide various services, such as a video playback client and a game client.

6) Interaction process: it is a process developed by virtual objects in a virtual scene according to the time of interaction or the state of interaction, such as a fighting process of virtual objects in a game and a fighting process of virtual objects in a scene of a game.

7) Multi-player online battle arena (MOBA): it is an action real-time strategy game in which players may choose types they are good at from a variety of types of characters and start a battle in two rival camps (usually 5 vs 5), and a condition of victory is to break through a defense line and destroy buildings guarded by the enemy.

8) Auto Chess: it is a novel multi-player battle strategy game in which a user may match and train a chess piece lineup to fight against a chess piece lineup of an opponent, the loser's hit points (HP) will be reduced, and ranking is determined in order of elimination. Chess pieces (that is, virtual objects) are different combat units in a virtual scene, and the user may perform operations, such as equipping, upgrading, purchasing, and selling, on the chess pieces. Most of the chess pieces are obtained by refreshing a pool of chess pieces, and a small part is from "draft" and combat activities.

In the related technologies, Auto Chess is taken as an example, a user checks chess pieces of an opponent in the following way: the user clicks on an avatar of the opponent, switches to a chessboard of the opponent, checks chess pieces in the chessboard of the opponent and in a preparation area, and self-calculates the number and types of chess pieces present.

Exemplarily, referring to FIG. 1 that is a schematic diagram of an application scenario of an interaction processing method for a virtual scene according to the related technology, as shown in FIG. 1, chess pieces (including chess pieces in a chessboard and in a preparation area) that have been selected by a user and avatars and account names of a plurality of other users participating in a game are displayed in a chessboard interface 100 corresponding to the user with an account name of "Hiroko". When the user with the account name of "Hiroko" wants to check chess pieces of another user, the user may click on an avatar of the corresponding user. For example, when clicking on an avatar 101 corresponding to a user with an account name "Kaixin", the user will jump to a chessboard interface 102 corresponding to the user with the account name "Kaixin", so that the user may check chess pieces that have been selected by the user with the account name of "Kaixin" in the chessboard interface 102. Similarly, when the user with the account name of "Hiroko" wants to check chess pieces that have been by a user with an account name of "Luoye", the user may click on an avatar corresponding to the user with the account name of "Luoye", so as to jump to a chessboard interface corresponding to the user with the account name of "Luoye" for checking.

It can be seen that in the related technology, the efficiency of checking information about chess pieces that have been currently used is relatively low. A user needs to continuously check information about the number and types of chess pieces in chessboards of a plurality of other users (for example, seven opponents), and needs to manually calculate and remember the number and types, which consumes more time, relatively reduces the time for the user to make a decision, and makes the insufficient time even more tense. In addition, a client needs to jump between chessboards corresponding to different users when the user checks, resulting in low effectiveness of human-computer interaction.

In view of this, the embodiments of this application provide an interaction processing method and apparatus for a virtual scene, an electronic device, a non-transitory computer-readable storage medium, and a computer program product, which can accelerate an interaction process in a virtual scene, and reduce the waiting time and resource consumption of a server. In order to make it easier to understand the interaction processing method for a virtual scene according to the embodiments of this application, an exemplary implementation scenario of the interaction processing method for a virtual scene according to the embodiments of this application is first described. A virtual scene in the interaction processing method for a virtual scene according to the embodiments of this application may be completely outputted based on a terminal device, or cooperatively outputted based on a terminal device and a server.

In some other embodiments, the virtual scene may also be an environment for game character interaction, for example, may be an environment for a battle between game characters. By controlling actions of the game characters, users at opposing sides may interact in the virtual scene, thereby relieving the pressure of life during a game.

Figure 2A:
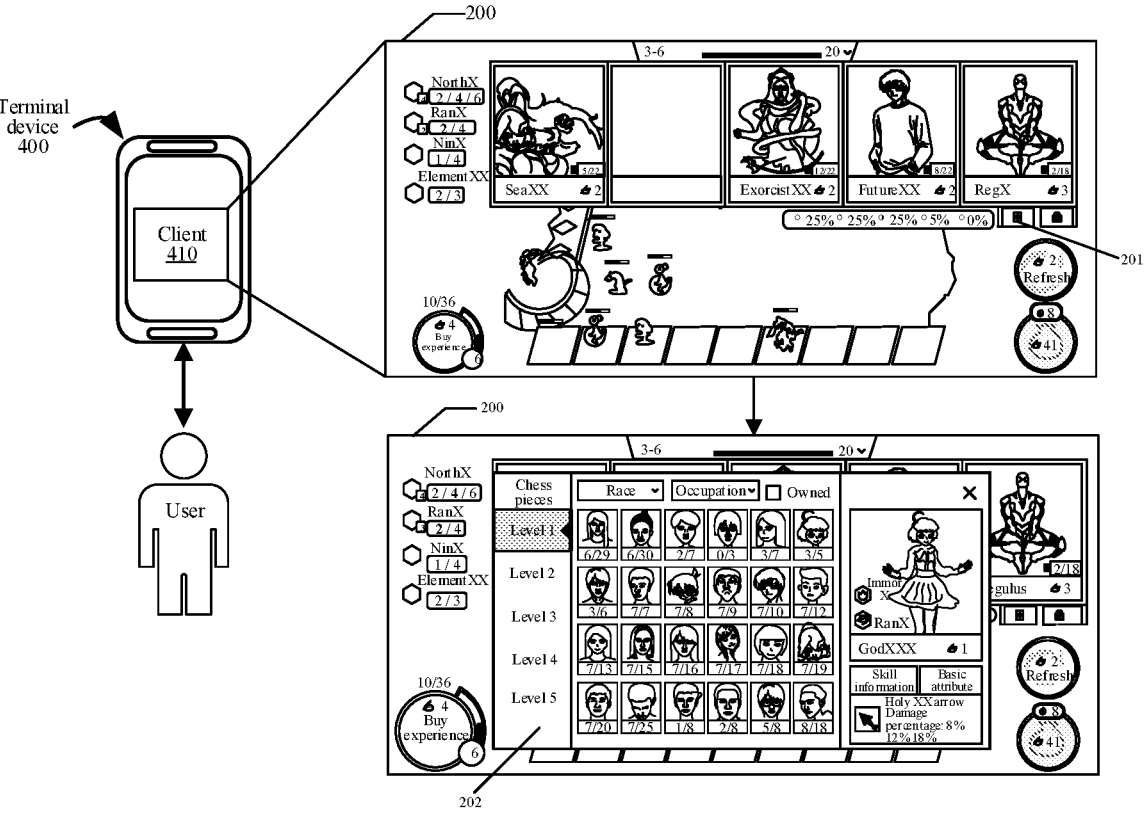
FIG. 2A is a schematic diagram of an application mode of an interaction processing method for a virtual scene according to an embodiment of this application.

In an implementation scenario, referring to FIG. 2A that is a schematic diagram of an application mode of an interaction processing method for a virtual scene according to an embodiment of this application, the method is applicable to some application modes completely relying on the computing power of graphics processing hardware of a terminal device 400 to complete calculation of relevant data of a virtual scene 200 such as a game in a stand-alone version/off-line mode, and completing output of the virtual scene through different types of terminal devices 400 such as a smart phone, a tablet computer, and a virtual reality/augmented reality device.

As an example, types of graphics processing hardware include a central processing unit (CPU) and a graphics processing unit (GPU).

When forming a visual perception of the virtual scene 200, the terminal device 400 calculates data required for display through graphics computing hardware, and completes loading, parsing, and rendering of display data, and outputs a video frame capable of forming the visual perception of the virtual scene through graphics output hardware. For example, a two-dimensional video frame is presented on a display screen of a smart phone, or a video frame for achieving a three-dimensional display effect is projected on lenses of augmented reality/virtual reality glasses. In addition, in order to enrich the perception effect, the terminal device 400 may also form one or more of an auditory perception, a tactile perception, a motion perception, and a taste perception through different hardware.

As an example, a client 410 (such as a game application in a stand-alone version) runs on the terminal device 400, and a virtual scene including a role-playing is outputted in the running process of the client 410. The virtual scene may be an environment for game character interaction, for example, may be a plain, a street, a valley, or the like for a battle between game characters. The virtual scene 200 displayed from a third-person perspective is taken as an example, the virtual scene 200 includes identifiers of a plurality of accounts. For example, at least one of an account name and an avatar corresponding to each of the plurality of accounts may be displayed in the virtual scene 200 (not shown in FIG. 2A). Each account is capable of controlling at least one virtual object to interact with at least one virtual object controlled by another account. A counter button 201 is also displayed in the virtual scene 200. When receiving a trigger operation (such as a click operation) of a user for the counter button 201, the client 410 displays a counter control 202 in the virtual scene 200. The counter control 202 includes the number of virtual objects of each type that have been used and the total number of virtual objects of each type that are allowed to be used. For example, the first virtual object in the counter control 202 is taken as an example, the number "6/29" indicates that the number of virtual objects of this type that have been used is 6, and the total number of virtual objects of this type that are allowed to be used is 29 (for example, at most 29 virtual objects of this type can participate in a game). In this way, an interaction process in the virtual scene is accelerated, and the waiting time and resource consumption of a server are reduced.

Figure 2B:
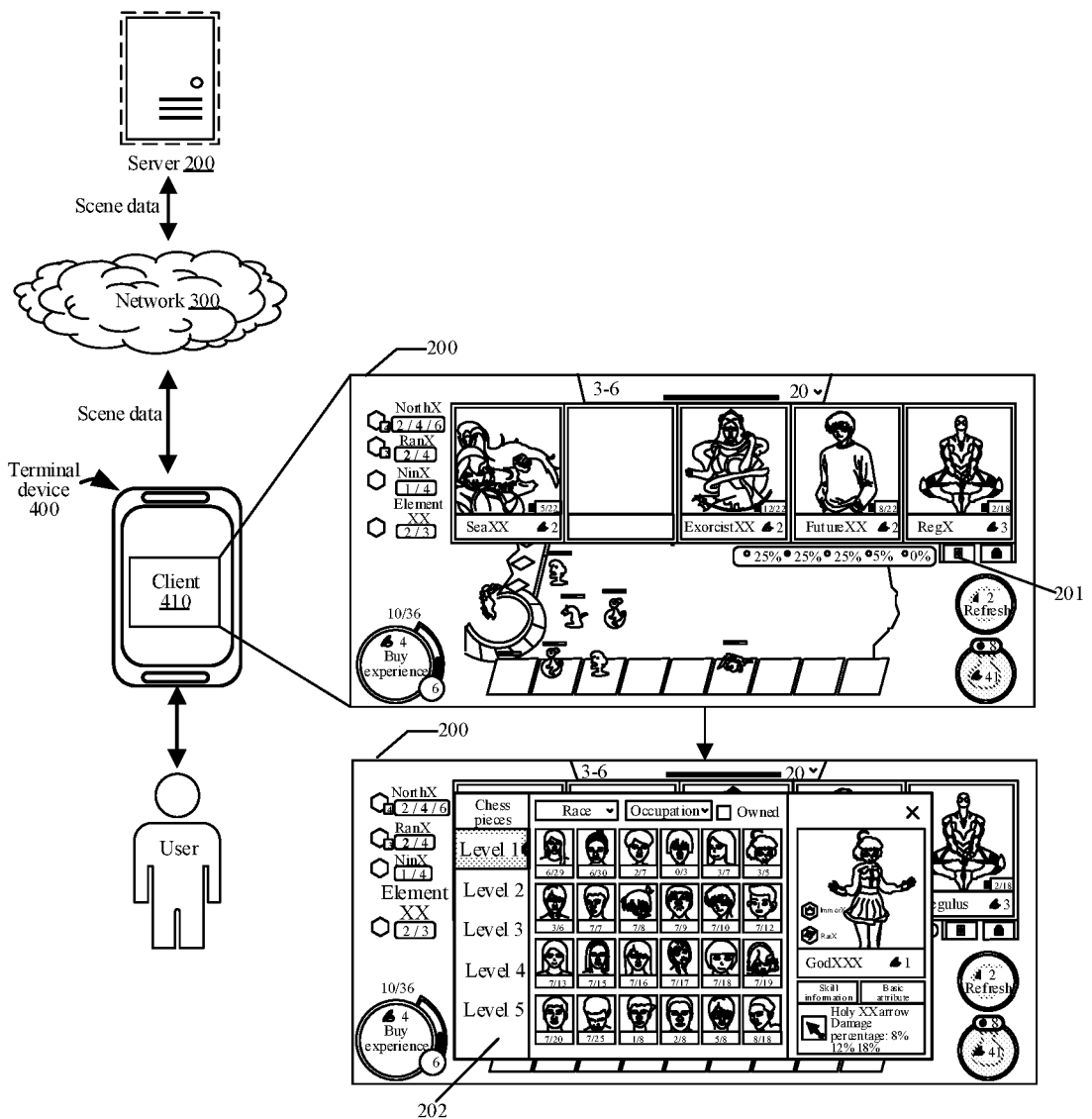
FIG. 2B is a schematic diagram of an application mode of an interaction processing method for a virtual scene according to an embodiment of this application.

In another implementation scenario, referring to FIG. 2B that is a schematic diagram of an application mode of an interaction processing method for a virtual scene according to an embodiment of this application, the method is applied to a terminal device 400 and a server 200, and is applicable to an application mode replying on the computing power of the server 200 to complete calculation of a virtual scene and outputting the virtual scene on the terminal device 400.

Formation of a visual perception of a virtual scene 200 is taken as an example, the server 200 calculates display data (such as scene data) related to the virtual scene and transmits the display data to the terminal device 400 through a network 300, and the terminal device 400 relies on graphics computing hardware to complete loading, parsing, and rendering of the calculated display data, and relies on graphics output hardware to output the virtual scene to form the visual perception. For example, a two-dimensional video frame may be presented on a display screen of a smart phone, or a video frame for achieving a three-dimensional display effect may be projected on lenses of augmented reality/virtual reality glasses. With regard to perceptions of the form of a virtual scene, it will be appreciated that other perceptions may be formed through corresponding output hardware of the terminal device 400. For example, an auditory perception is formed by using a microphone, and a tactile perception is formed by using a vibrator.

As an example, a client 410 (such as a game application in a network version) runs on a terminal device 400, and by connecting to the server 200 (such as a game server) to perform a game interaction with other users, the terminal device 400 outputs a virtual scene 200 of the client 410. The virtual scene 200 includes identifiers of a plurality of accounts. For example, at least one of an account name and an avatar corresponding to each of the plurality of accounts may be displayed in the virtual scene 200 (not shown in FIG. 2B). Each account is capable of controlling at least one virtual object to interact with at least one virtual object controlled by another account. A counter button 201 is also displayed in the virtual scene 200. When receiving a trigger operation (such as a click operation) of a user for the counter button 201, the client 410 displays a counter control 202 in the virtual scene 200. The counter control 202 includes the number of virtual objects of each type that have been used and the total number of virtual objects of each type that are allowed to be used. For example, the first virtual object in the counter control 202 is taken as an example, the number "6/29" indicates that the number of virtual objects of this type that have been used is 6, and the total number of virtual objects of this type that are allowed to be used is 29 (for example, at most 29 virtual objects of this type can participate in a game). In this way, an interaction process in the virtual scene is accelerated, and the waiting time and resource consumption of a server are reduced.

In some embodiments, the terminal device 400 may implement the interaction processing method for a virtual scene according to the embodiments of this application by operating a computer program. For example, the computer program may be a native program or a software module in an operating system; may be a native application program (APP), that is, a program that needs to be installed into an operating system to run, such as a multi-player battle strategy game APP (that is, the foregoing client 410); may also be a mini program, that is, a program that only needs to be downloaded into a browser environment to run; or may also be a game mini program that can be embedded in any APP. In general, the foregoing computer program may be any form of application program, module or plug-in.

The computer program being an application program is taken as an example, in actual implementation, the application program supporting a virtual scene is installed and runs on the terminal device 400. The application program may be any one of a multi-player battle strategy game, a virtual reality application program, a three-dimensional map program, and a multi-player gunbattle survival game. A user uses the terminal device 400 to operate a virtual object located in a virtual scene to perform an activity, which includes, but is not limited to, at least one of adjusting body posture, crawling, walking, running, riding, jumping, driving, picking up, shooting, attacking, throwing, and constructing a virtual building. Exemplarily, the virtual object may be a virtual character, such as a simulated character and a cartoon character.

In some other embodiments, the embodiments of this application may be implemented through cloud technology, which refers to a hosting technology that unifies a series of resources, such as hardware, software, and networks, in a wide area network or a local area network to realize calculation, storage, processing, and sharing of data.

Cloud technology is a general term for network technology, information technology, integration technology, management platform technology, and application technology based on a cloud computing business model, which may form a resource pool, is used as needed, and is flexible and convenient. Cloud computing technology will become an important support. Backend services of a technical network system require a large amount of computing and storage resources.

Exemplarily, the server 200 in FIG. 2B may be an independent physical server, may also be a server cluster or distributed system composed of a plurality of physical servers, or may also be a cloud server providing basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform. The terminal device 400 may be a smart phone, a tablet computer, a notebook computer, a desktop computer, a smart speaker, a smart watch, or the like, but is not limited thereto. The terminal device 400 and the server 200 may be directly or indirectly connected through wired or wireless communication, which is not defined herein.

Figure 3:
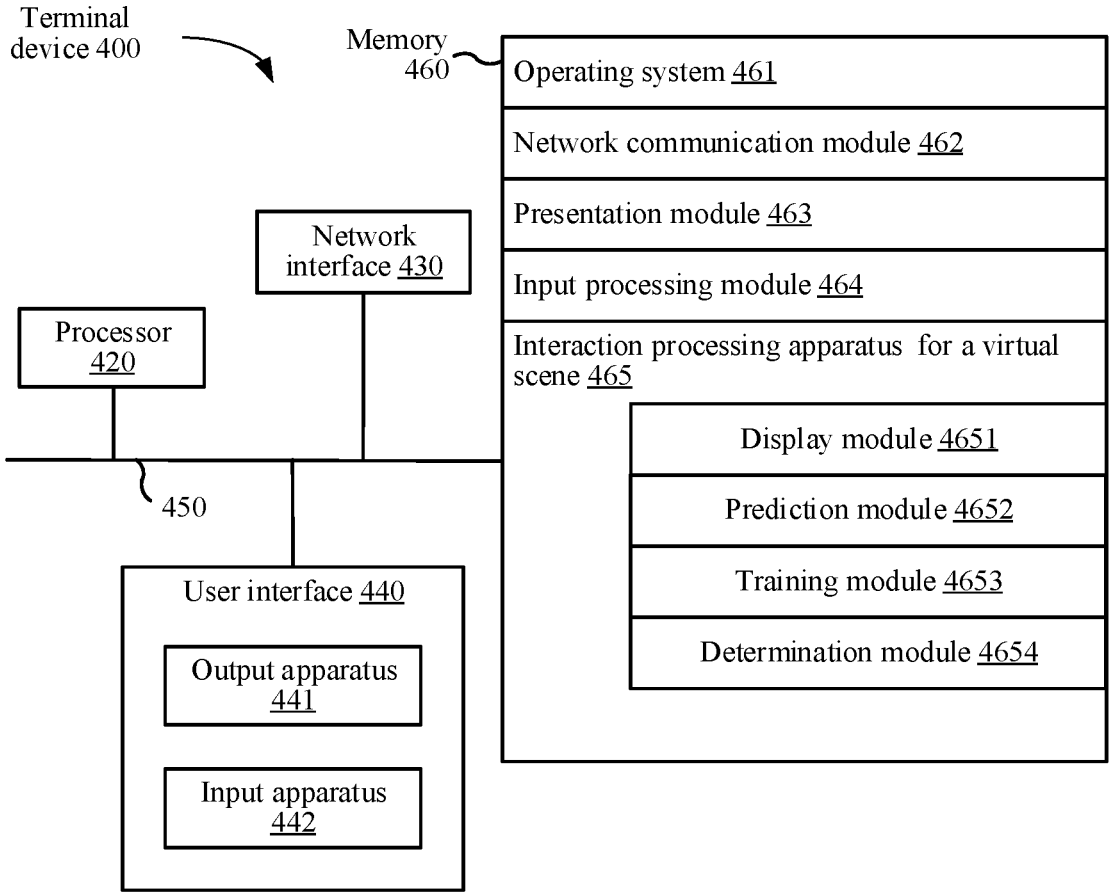
FIG. 3 is a schematic structural diagram of a terminal device 400 according to an embodiment of this application.

A structure of the terminal device 400 shown in FIG. 2A will be described below. Referring to FIG. 3 that is a schematic structural diagram of a terminal device 400 according to an embodiment of this application, the terminal device 400 shown in FIG. 3 includes: at least one processor 420, a memory 460, at least one network interface 430, and a user interface 440. The components in the terminal device 400 are coupled together through a bus system 450. It will be appreciated that the bus system 450 is configured to implement connection and communication between the components. In addition to a data bus, the bus system 450 further includes a power bus, a control bus, and a state signal bus. For ease of clear description, all types of buses in FIG. 3 are marked as the bus system 450.

The processor 420 may be an integrated circuit chip having signal processing capabilities, such as a general-purpose processor, a digital signal processor (DSP), and other programmable logic devices, discrete gates or transistor logic devices, and discrete hardware components. The general-purpose processor may be a microprocessor or any conventional processor.

The user interface 440 includes one or more output apparatuses 441 capable of presenting media content, which includes one or more speakers and/or one or more visual display screens. The user interface 440 further includes one or more input apparatuses 442, which includes a user interface component that facilitates user input, such as a keyboard, a mouse, a microphone, a touch screen display, a camera, and other input buttons and controls.

The memory 460 may be removable, non-removable, or a combination thereof. Exemplary hardware devices include a solid state memory, a hard disk drive, an optical disk drive, and the like. The memory 460 includes one or more storage devices physically located remotely from the processor 420.

The memory 460 includes a volatile memory or a non-volatile memory, or may include both volatile and non-volatile memories. The non-volatile memory may be a read only memory (ROM) and the volatile memory may be a random access memory (RAM). The memory 460 described herein is intended to include any suitable type of memory.

In some embodiments, the memory 460 is capable of storing data to support various operations, and examples of the data include a program, a module, and a data structure or a subset or a superset thereof, as exemplified below.

An operating system 461 includes system programs used for processing various basic system services and performing hardware-related tasks, such as a framework layer, a core library layer, and a driver layer, and is configured to implement various basic services and process hardware-based tasks.

A network communication module 462 is configured to reach other computing devices via one or more (wired or wireless) network interfaces 430, and exemplary network interfaces 430 include: Bluetooth, Wireless-Fidelity (WiFi), a universal serial bus (USB), and the like.

A presentation module 463 is configured to present information through one or more output apparatuses 441 (such as a display screen and a speaker) associated with the user interface 440 (such as a user interface configured to operate a peripheral device and display content and information).

An input processing module 464 is configured to detect one or more user inputs or interactions from one of the one or more input apparatuses 442 and translating the detected inputs or interactions.

In some embodiments, an interaction processing apparatus for a virtual scene according to the embodiments of this application may be implemented in the form of software. FIG. 3 shows an interaction processing apparatus 465 for a virtual scene stored in the memory 460, which may be software in the form of a program, a plug-in, or the like, and include the following software modules: a display module 4651, a control module 4652, a determination module 4653, and an application module 4654. These modules are logical and thus may be combined arbitrarily or further split according to implemented functions. It is to be pointed out that for ease of presentation, all of the foregoing modules are shown in FIG. 3 at one time, but it shall not be considered that the interaction processing apparatus 465 for a virtual scene excludes the implementation that only includes the display module 4651. The functions of the modules will be described below.

The interaction processing method for a virtual scene according to the embodiments of this application will be described in detail below with reference to the drawings. The interaction processing method for a virtual scene according to the embodiments of this application may be performed by the terminal device 400 in FIG. 2A alone, or may be cooperatively performed by the terminal device 400 and the server 200 in FIG. 2B.

Figure 4:
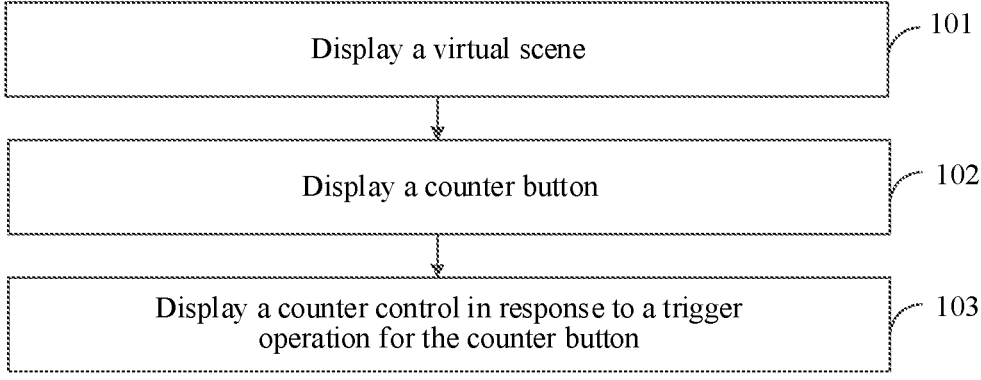
FIG. 4 is a schematic flowchart of an interaction processing method for a virtual scene according to an embodiment of this application.

A description will be made below by taking a situation where the interaction processing method for a virtual scene according to the embodiments of this application is performed by the terminal device 400 in FIG. 2A alone as an example. Referring to FIG. 4 that is a schematic flowchart of an interaction processing method for a virtual scene according to an embodiment of this application, a description will be made with reference to steps shown in FIG. 4.

The method shown in FIG. 4 may be performed by various forms of computer programs running on the terminal device 400, which is not limited to the foregoing client 410 and may also be the foregoing operating system 461, software modules or scripts. Therefore, the client shall not be construed as limiting the embodiments of this application.

Step 101: Display a virtual scene.

The virtual scene here may include identifiers of a plurality of accounts. For example, at least one of an account name and an avatar corresponding to each of the plurality of accounts participating in the interaction may be displayed in the virtual scene. In addition, each account is capable of controlling (or using) at least one virtual object to interact with at least one virtual object controlled by another account. When there are a plurality of virtual objects, types of the virtual objects may be the same or different. For example, account 1 may control two virtual objects A of the same type to interact with two virtual objects of different types (such as a virtual object B and a virtual object C) controlled by account 2. Moreover, the number of virtual objects that can be controlled by each account is positively related to an account level. For example, the maximum number of virtual objects that can be controlled by account is the same as the account level. That is, when the account level is level 1, at most one virtual object can be controlled; when the account level is level 2, at most two virtual objects can be controlled; and so on. In this way, a user may make a decision on the account level and the selection of a virtual object. For example, the user may determine to consume a certain amount of virtual resources (such as virtual gold coins) to purchase experience to upgrade the account level according to a current game situation, thereby increasing the upper limit of the number of virtual objects that can be controlled, or to consume a certain amount of virtual gold coins to purchase a virtual object, thereby improving the interest of a game.

Step 102: Display a counter button.

In some embodiments, before the counter button is displayed, the following processing may also be performed: a store entry is displayed; and a store control is displayed in response to a trigger operation for the store entry, the store control including a plurality of different types of virtual objects that are allowed to be used, and the operation of displaying a counter button is performed.

Figure 5:
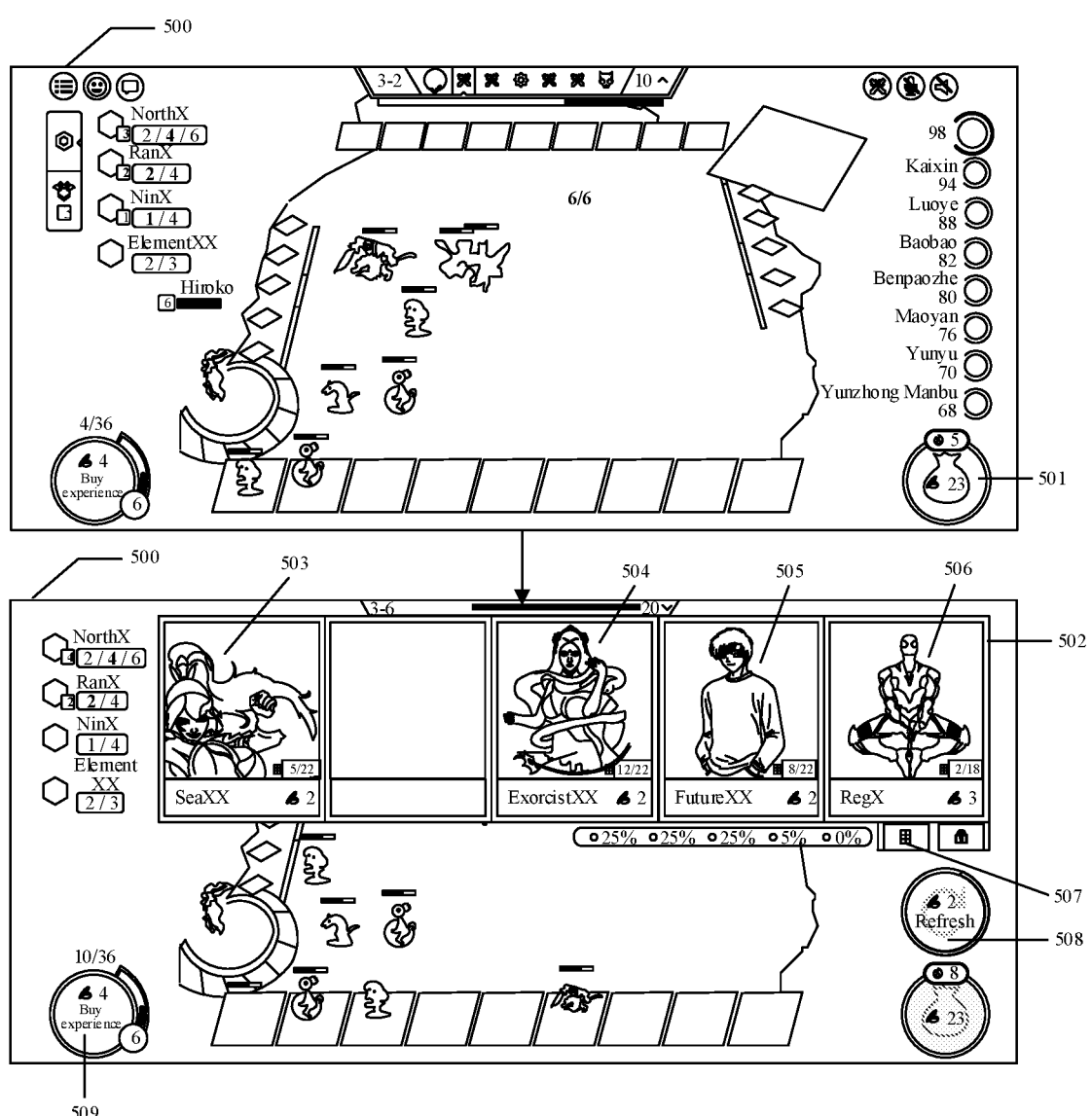
FIG. 5 is a schematic diagram of an application scenario of an interaction processing method for a virtual scene according to an embodiment of this application.

Exemplarily, referring to FIG. 5 that is a schematic diagram of an application scenario of an interaction processing method for a virtual scene according to an embodiment of this application, as shown in FIG. 5, a store entry 501 is displayed in a virtual scene 500, a store control 502 is displayed when a click operation of a user for the store entry 501 is received, and a plurality of different types of virtual objects that are allowed to be used are displayed in the store control 502 for the user to select. For example, the virtual objects include a virtual object 503, a virtual object 504, a virtual object 505, and a virtual object 506. In addition, a counter button 507 is also displayed in the store control 502. In this way, the user may click on the counter button 507 to check the number of virtual objects of each type in the virtual scene that have been currently used and the total number of virtual objects of each type that are allowed to be used before selecting a virtual object, so that the user may select a desired virtual object in the store control 502 in a targeted manner. For example, the client consumes, in response to a selection operation for at least one virtual object of at least one type in the plurality of different types of virtual objects that are allowed to be used and displayed in the store control, a certain amount of virtual resources for the corresponding account as a usage fee of the virtual object. When different types of virtual objects are selected, quantities of virtual resources required to be consumed may be the same or different. For example, when the user clicks on the virtual object 504 displayed in the store control 502, virtual gold coins owned by the user will be reduced by 2 (that is, from 23 to 21), and the virtual object 504 selected by the user is displayed in a preparation area.

A refresh button 508 may also be displayed in the virtual scene 500. The user may click on the refresh button 508 to refresh (each time the user clicks on the refresh button 508, 2 virtual gold coins will be consumed) when the user is not satisfied with virtual objects currently displayed in the store control 502, and other types of virtual objects are updated and displayed in the store control 502 when a click operation of the user for the refresh button 508 is received. Other types of virtual objects here are at least partially different from the plurality of different types of virtual objects. For example, if virtual object A, virtual object B, and virtual object C are originally displayed in the store control, virtual object D, virtual object E, and virtual object F may be updated and displayed in the store control when the click operation of the user for the refresh button is received. In addition, an experience purchase button 509 may also be displayed in the virtual scene 500 for the user to consume a certain amount of virtual resources (such as virtual gold coins and virtual ingots) to upgrade the account level. For example, each time the user clicks on the experience purchase button, the user's virtual gold coins will be reduced by 50, and the user's account level is upgraded by 1 level after the virtual gold coins are successfully deducted, thereby increasing the upper limit of the number of virtual objects that are allowed to be used by the account.

In some other embodiments, step 102 may also be implemented by the following method: the following processing is performed for each interaction: the counter button is displayed in an interaction area of the virtual scene before the interaction starts; and the counter button is hidden in the interaction area of the virtual scene when the interaction starts.

Exemplarily, the counter button may be displayed in the store control, or may also be directly displayed in the interaction area of the virtual scene. As an alternative solution to the counter button being always displayed in the interaction area of the virtual scene, the counter button may also not always be displayed in the interaction area of the virtual scene. For example, the counter button may be displayed in the interaction area of the virtual scene before each interaction starts (that is, in a preparation phase of a current round), so that the user may first click on the counter button to check the number of virtual objects of each type in the virtual scene that have been currently used and the total number of virtual objects of each type that are allowed to be used before selecting a virtual object required to be used in the current round in the store control, and may select a desired virtual object in the store control in a targeted manner. Moreover, the counter button may be hidden in the interaction area of the virtual scene when the interaction starts (that is, at the end of the countdown of the preparation phase of the current round). In this way, the occlusion of a picture of the interaction between virtual objects by the display of the counter button is avoided, and the user's user experience is improved.

Step 103: Display a counter control in response to a trigger operation on the counter button.

The counter control here may include the number of virtual objects of each type that have been used and the total number of virtual objects of each type that are allowed to be used. For example, the number of virtual objects of all types in the virtual scene that have been currently used and the total number of virtual objects of each type that are allowed to be used may be displayed in the counter control.

Exemplarily, if the virtual scene includes a total of five different types of virtual objects, that is, virtual object A, virtual object B, virtual object C, virtual object D, and virtual object E, respectively, the following content may be displayed in the counter control: the number of virtual objects A that have been currently used (such as 2) and the total number of virtual objects A that are allowed to be used (such as 9); the number of virtual objects B that have been currently used (such as 1) and the total number of virtual objects B that are allowed to be used (such as 5); the number of virtual objects C that have been currently used (such as 3) and the total number of virtual objects C that are allowed to be used (such as 10); the number of virtual objects D that have been currently used (such as 0) and the total number of virtual objects D that are allowed to be used (such as 4); and the number of virtual objects E that have been currently used (such as 1) and the total number of virtual objects E that are allowed to be used (such as 6).

In some embodiments, the plurality of accounts may be grouped for one-to-one interaction (for example, if there are a total of eight accounts, which are account 1 to account 8, account 1 may interact with account 3, account 2 may interact with account 5, account 3 may interact with account 7, and account 4 may interact with account 6), and the following processing may be performed for a target account in the plurality of accounts: a selected account is determined as an interaction account of the target account in response to a selection operation for the plurality of accounts; or an account is automatically selected from the plurality of accounts as an interaction account of the target account, a selection method including any one of the following: random selection (that is, an account is randomly selected from other accounts as an interaction account of the target account), and selection of an account that has an interaction parameter (such as the combat power of a virtual object owned by the target account and hit points of an auxiliary virtual object corresponding to the target account) difference with the target account being less than a threshold value (for example, an account corresponding to an auxiliary virtual object whose hit points are closest to those of the auxiliary virtual object corresponding to the target account is selected from other accounts as an interaction account of the target account, or an account whose combat power is closest to that of the virtual object owned by the target account is taken as an interaction account of the target account). When the counter control is displayed in response to the trigger operation on the counter button, the number of virtual objects of each type that have been used by the interaction account and the total number of virtual objects of each type that are allowed to be used may also be displayed in the counter control.

Exemplarily, if there are a total of eight accounts, which are account 1 to account 8, and account 1 is a target account, an account randomly selected from other accounts (that is, account 2 to account 8) may be taken as an interaction account of account 1. For example, if account 4 is randomly selected from account 2 to account 8, account 4 may be taken as an interaction account of account 1, that is, a virtual object controlled by account 1 will interact with a virtual object controlled by account 4.

Exemplarily, if there are a total of eight accounts, which are account 1 to account 8, account 1 is a target account, hit points of an auxiliary virtual object (that is, a virtual object configured to assist a virtual object controlled by account 1 in interaction, such as a partner object summoned by the virtual object controlled by account 1) corresponding to account 1 is 90, and hit points of auxiliary virtual objects corresponding to account 2 to account 8 are 80, 82, 85, 93, 89, 92, and 100, respectively, that is, the hit points of the auxiliary virtual object corresponding to account 6 is closest to the hit points of the auxiliary virtual object corresponding to account 1, account 6 may be taken as an interaction account of account 1, that is, a virtual object controlled by account 1 will interact with a virtual object controlled by account 6.

Exemplarily, if there are a total of eight accounts, which are account 1 to account 8, account 1 is a target account, the combat power (for example, may be comprehensively determined according to parameters such as the attack power, the defensive power, and hit points of the virtual object controlled by account 1, and the higher the attack power, the defensive power, and the hit points of the virtual object controlled by account 1 is, the stronger the combat power of the virtual object is) of a virtual object controlled by account 1 is 90, and the combat powers of virtual objects controlled by account 2 to account 8 are 86, 89, 93, 100, 70, 85, and 99, respectively, that is, the combat power of the virtual object controlled by account 3 is closest to the combat power of the virtual object controlled by account 1, account 3 may be taken as an interaction account of account 1, that is, the virtual object controlled by account 1 will interact with the virtual object controlled by account 3.

Exemplarily, account 1 is a target account, a user corresponding to account 1 may select one account from the plurality of accounts displayed in the virtual scene as an interaction account. For example, when a selection operation of the user corresponding to account 1 for an avatar corresponding to account 3 displayed in the virtual scene is received, account 3 is determined as an interaction account of account 1, and a client of the user corresponding to account 1 displays a counter control when receiving a click operation of the user corresponding to account 1 for a counter button displayed in the virtual scene, and displays the number of virtual objects of each type that have been currently used by account 3 and the total number of virtual objects of each type that are allowed to be used in the counter control. For example, if account 3 currently only selects virtual object A and virtual object B, only the number of virtual objects A that have been currently used and the total number of virtual objects A that are allowed to be used, and the number of virtual objects B that have been currently used and the total number of virtual objects B that are allowed to be used are displayed in the counter control. In this way, the effectiveness of human-computer interaction in the virtual scene can be further improved, it is convenient for the user to check relevant information about a virtual object selected by a specific user (such as an opponent), the user decision-making time is reduced, the user's use experience is improved, and the waiting time and resource consumption of a server are also reduced.

In some embodiments, the counter control may also include at least one filter index for the virtual objects, and a type of the filter index may include: levels, races, occupations, selection statuses, and account identifiers; and step 104 shown in FIG. 6 may also be performed after step 103 shown in FIG. 4 is performed, and a description will be made with reference to steps shown in FIG. 6.

Step 104: Update and display, in response to an index selection operation, the number of target virtual objects of at least one type corresponding to a selected filter parameter that have been used and the total number of target virtual objects of each type that are allowed to be used in the counter control.

In some embodiments, when the filter index is the levels, step 104 may be implemented by the following method: a plurality of levels are displayed in the counter control; and the number of target virtual objects of at least one type corresponding to a selected level that have been used and the total number of target virtual objects of each type that are allowed to be used are updated and displayed in the counter control in response to a level selection operation.

Figure 7A:
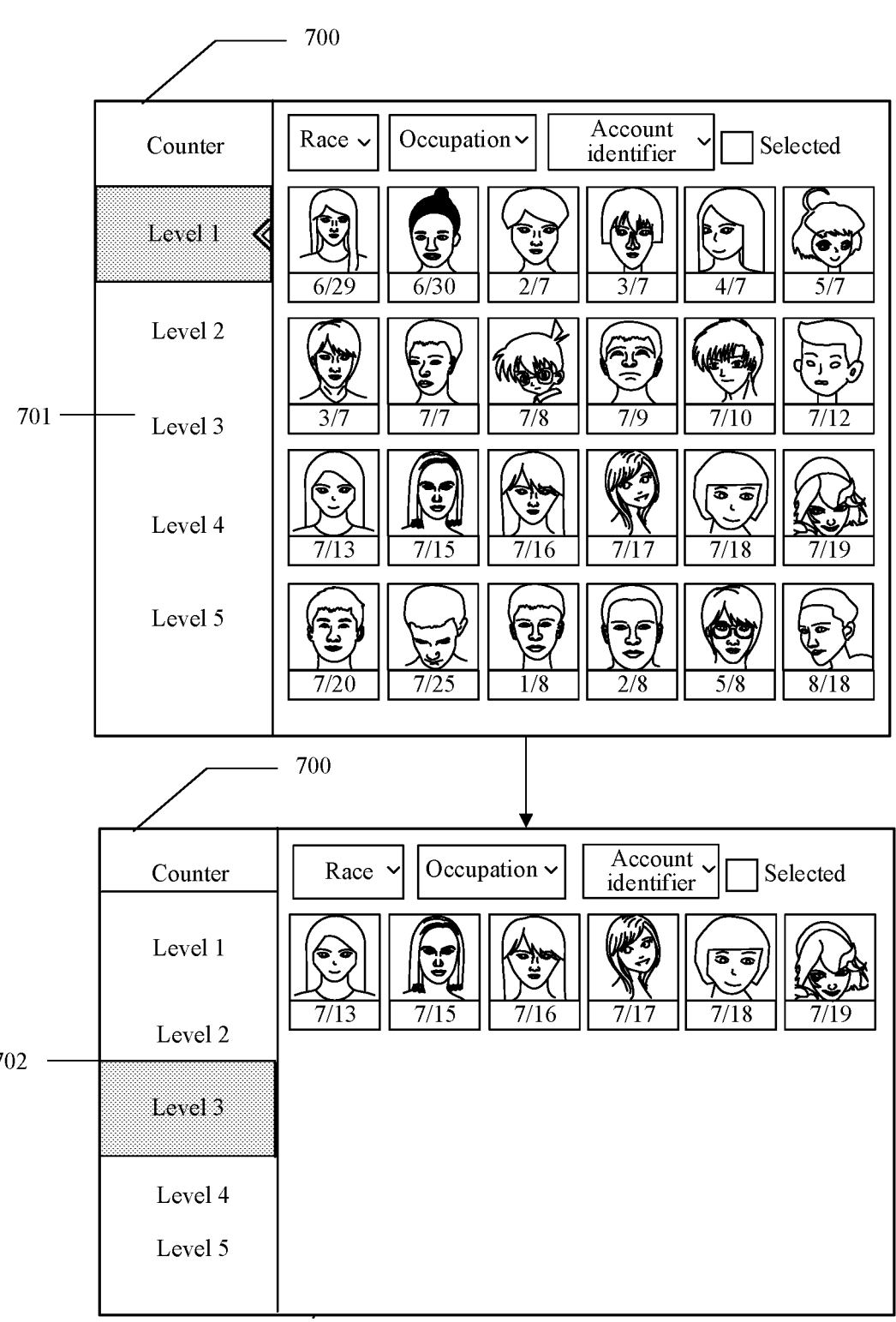
FIG. 7A to FIG. 7E are schematic diagrams of application scenarios of an interaction processing method for a virtual scene according to embodiments of this application.

Exemplarily, referring to FIG. 7A that is a schematic diagram of an application scenario of an interaction processing method for a virtual scene according to an embodiment of this application, as shown in FIG. 7A, a level list 701, including level 1, level 2, level 3, level 4, and level 5, is displayed in a counter control 700, and a virtual object of level 1 is displayed by default. When a user selects level 3 702 in the level list 701, a virtual object of level 3 is updated and displayed in the counter control 700 (that is, the number of virtual objects of each type corresponding to level 3 that have been used and the total number of virtual objects of each type corresponding to level 3 that are allowed to be used in the counter control). In this way, by setting the level list in the counter control, it is convenient for the user to check the number of virtual objects of a specific level that have been used, the time that the user needs to make a decision is reduced, the progress of a game is accelerated, and the waiting time and resource consumption of a server are also further reduced.

In some embodiments, when the filter index is the races, step 104 may be implemented by the following method: a race button is displayed in the counter control; a race list is displayed in response to a trigger operation for the race button; and the number of target virtual objects of at least one type corresponding to a selected race that have been used and the total number of target virtual objects of each type that are allowed to be used are updated and displayed in the counter control in response to a selection operation for the race list.

Figure 7B:
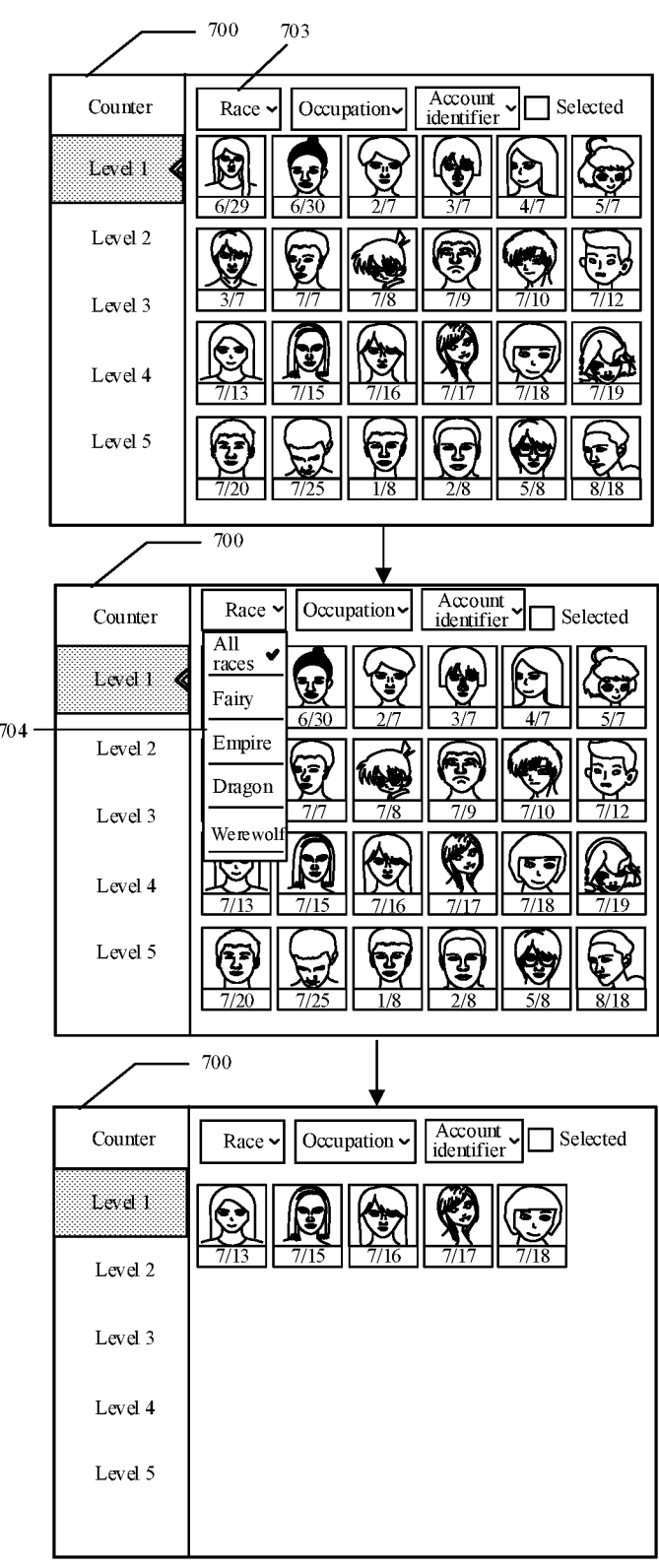

Exemplarily, referring to FIG. 7B that is a schematic diagram of an application scenario of an interaction processing method for a virtual scene according to an embodiment of this application, as shown in FIG. 7B, a race button 703 is displayed in a counter control 700. When a click operation of a user for the race button 703 is received, a race list 704 is displayed. For example, the race list includes all races, fairy, empire, dragon, and werewolf. When the user selects the fairy in the race list 704, the number of virtual objects of each type corresponding to the fairy that have been used and the total number of virtual objects of each type corresponding to the fairy that are allowed to be used are updated and displayed in the counter control 700. In this way, by setting the race button in the counter control, it is convenient for the user to check the number of virtual objects of a specific race that have been used and the total number of virtual objects that are allowed to be used, and the effectiveness of human-computer interaction in the virtual scene is further improved.

In some embodiments, when the filter index is the occupations, step 104 may be implemented by the following method: an occupation button is displayed in the counter control; an occupation list is displayed in response to a trigger operation for the occupation button; and the number of target virtual objects of at least one type corresponding to a selected occupation that have been used and the total number of target virtual objects of each type that are allowed to be used are updated and displayed in the counter control in response to a selection operation for the occupation list.

Figure 7C:
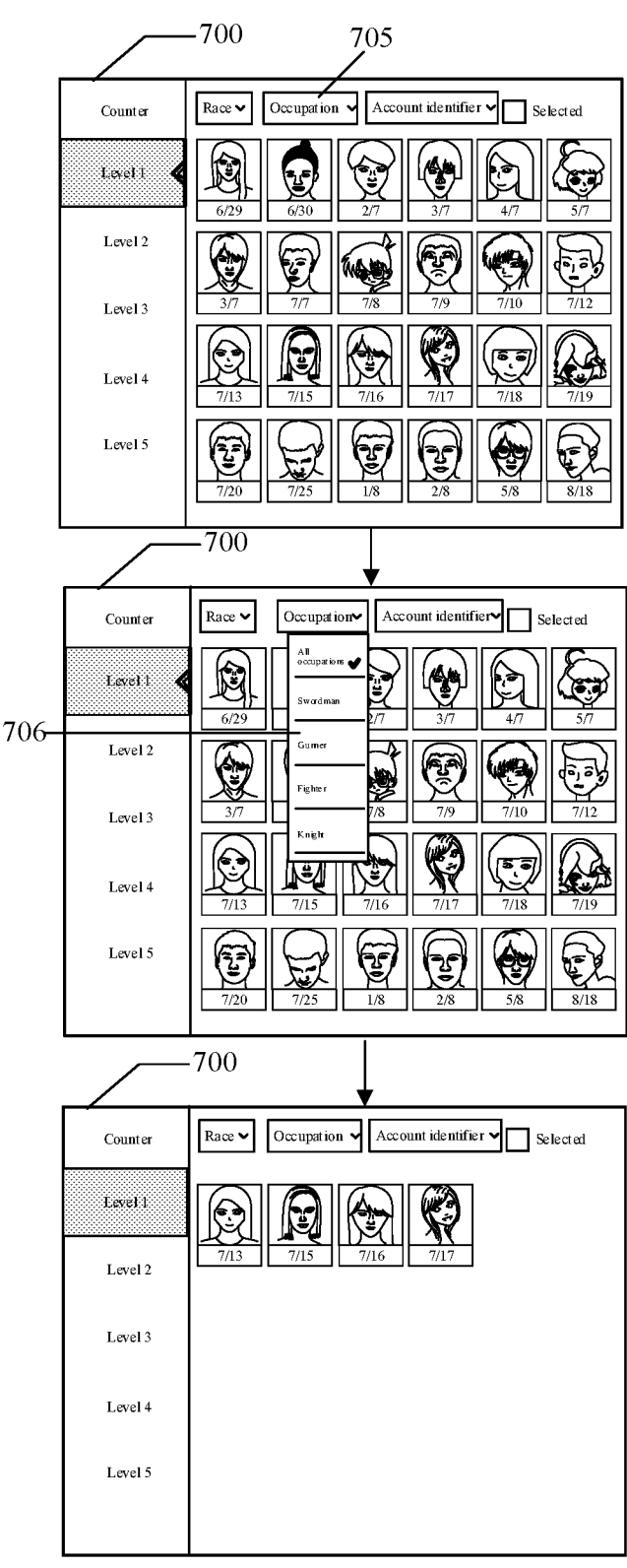

Exemplarily, referring to FIG. 7C that is a schematic diagram of an application scenario of an interaction processing method for a virtual scene according to an embodiment of this application, as shown in FIG. 7C, an occupation button 705 is displayed in a counter control 700. When a click operation of a user for the occupation button 705 is received, an occupation list 706 is displayed. For example, the occupation list includes all occupations, swordsman, gunner, fighter, and knight. When the user selects the fighter in the occupation list 706, the number of virtual objects of each type corresponding to the fighter that have been used and the total number of virtual objects of each type corresponding to the fighter that are allowed to be used are updated and displayed in the counter control 700. In this way, by setting the occupation button in the counter control, it is convenient for the user to check the number of virtual objects of a specific occupation that have been used and the total number of virtual objects that are allowed to be used, and the effectiveness of human-computer interaction in the virtual scene is further improved.

In some embodiments, when the filter index is the selection statuses, step 104 may be implemented by the following method: the following processing is performed in a virtual scene corresponding to each account: a "selected" selection button is displayed in the counter control; and the number of target virtual objects of at least one type that have been selected and used by the account and the total number of target virtual objects of each type that are allowed to be used are updated and displayed in the counter control in response to a selection operation for the selection button.

Figure 7D:
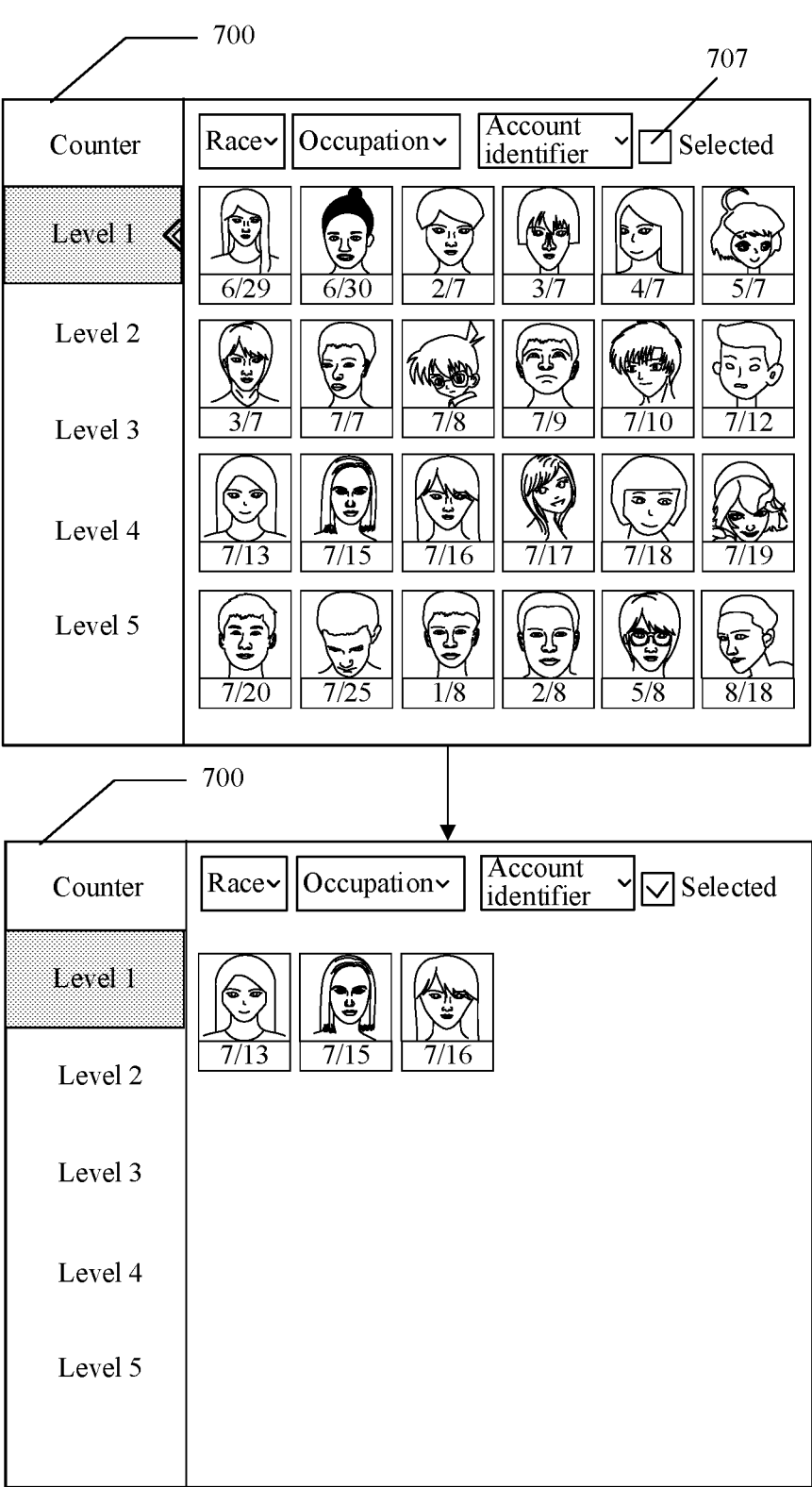

Exemplarily, referring to FIG. 7D that is a schematic diagram of an application scenario of an interaction processing method for a virtual scene according to an embodiment of this application, as shown in FIG. 7D, a "selected" selection button 707 is displayed in a counter control 700. When a selection operation of a user (if an account corresponding to the user is account 1) for the selection button 707 is received, the number of virtual objects of each type that have been selected and currently used by account 1 and the total number of virtual objects of each type that are allowed to be used are displayed and updated in the counter control 700. In this way, it is convenient for the user to check relevant information about the virtual objects that have been currently selected by the user, the user decision-making time is reduced, the progress of a game is accelerated, and the waiting time and resource consumption of a server are reduced.

In some other embodiments, when the filter index is the account identifiers, step 104 may be implemented by the following method: an account identifier button is displayed in a counter control; an identifier list is displayed in response to a trigger operation for the account identifier button, the identifier list including a plurality of identifiers corresponding to the plurality of accounts in a one-to-one manner; and the number of target virtual objects of at least one type corresponding to a selected identifier that have been used and the total number of target virtual objects of each type that are allowed to be used are updated and displayed in the counter control in response to a selection operation for the identifier list.

Figure 7E:
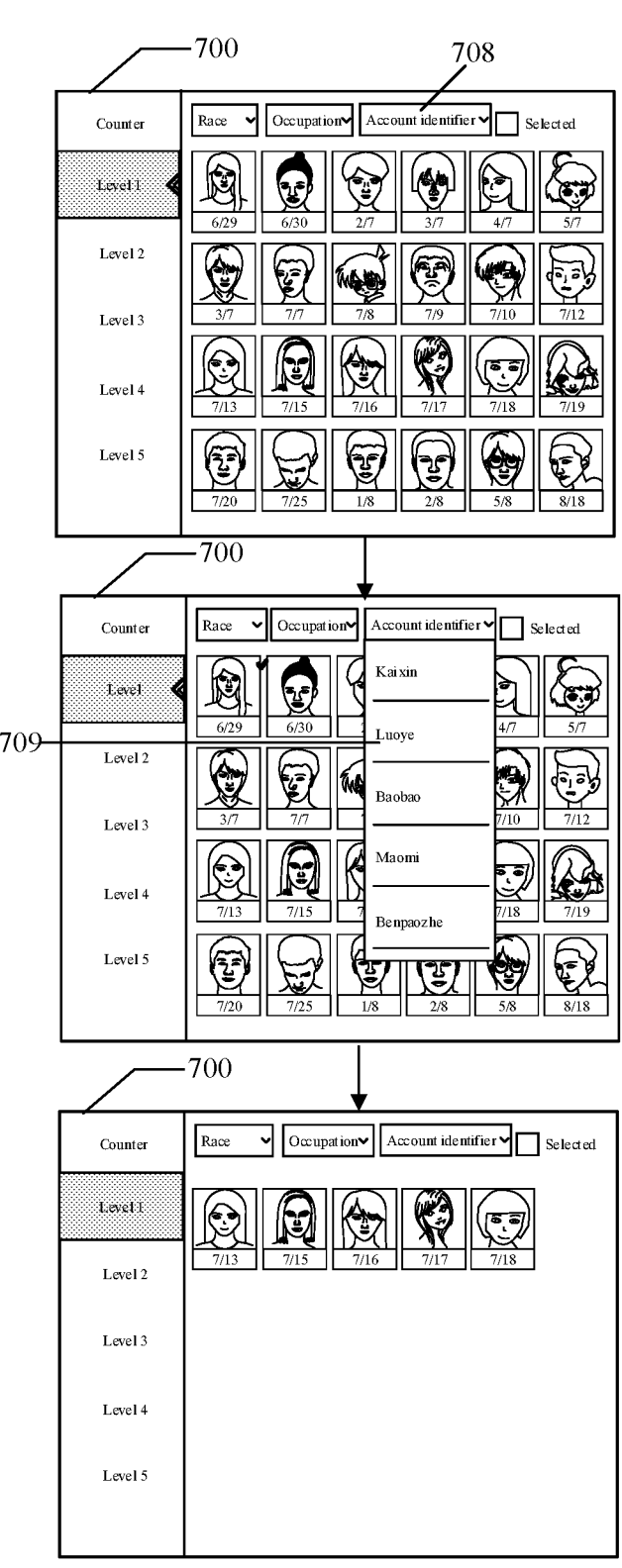

Exemplarily, referring to FIG. 7E that is a schematic diagram of an application scenario of an interaction processing method for a virtual scene according to an embodiment of this application, as shown in FIG. 7E, an account identifier button 708 is displayed in a counter control 700. When a click operation of a user for the account identifier button 708 is received, an identifier list 709, including account names corresponding to the plurality of accounts participating in the interaction such as "Kaixin", "Luoye", "Baobao", "Maomi", and "Benpaozhe", is displayed. When the user selects "Maomi" in the identifier list 709, the number of target virtual objects of at least one type corresponding to the account with the account name of "Maomi" that have been used and the total number of target virtual objects of each type that are allowed to be used are updated and displayed in the counter control 700. In this way, by setting the account identifier button in the counter control, it is convenient for the user to check the number of target virtual objects corresponding to a specific account (that is, virtual objects used by a specific account) that have been currently used and the total number of target virtual objects that are allowed to be used, and the effectiveness of human-computer interaction in the virtual scene is further improved.

The foregoing plurality of filter indexes may have an "AND" relationship therebetween. For example, when a user selects both level 1 and the fairy in the counter control, the number of virtual objects corresponding to level 1 and the fairy that have been currently used and the total number of virtual objects that are allowed to be used are updated and displayed in the counter control.

In some embodiments, referring to FIG. 8 that is a schematic flowchart of an interaction processing method for a virtual scene according to an embodiment of this application, as shown in FIG. 8, step 105 shown in FIG. 8 may also be performed after step 103 shown in FIG. 3 is performed, and a description will be made with reference to steps shown in FIG. 8.

Step 105: Display detailed information about any type of virtual object in response to a trigger operation for any type of virtual object displayed in the counter control.

The detailed information about any selected type of virtual object here may be displayed on a split screen with the counter control, may be displayed in a pop-up manner window covering the counter control, or may be displayed in the interaction area of the virtual scene. In addition, the detailed information may include the number of virtual objects of any type that have been used, the total number of virtual objects of any one type that are allowed to be used, and attribute information (such as hit points, magic points, and a skill) of any type of virtual object.

Exemplarily, referring to FIG. 9A that is a schematic diagram of an application scenario of an interaction processing method for a virtual scene according to an embodiment of this application, as shown in FIG. 9A, when a click operation of a user for a virtual object 901 displayed in a counter control 900 is received, a details page 902 of the virtual object 901 is displayed, and the number 903 of virtual objects 901 that have been currently used (for example, the number of virtual objects 901 that have been currently used is 8), the total number 904 of virtual objects 901 that are allowed to be used (for example, the total number of virtual objects 901 that are allowed to be used is 22), and attribute information of the virtual object 901 are displayed in the details page 902. For example, the attribute information includes the number 905 of virtual gold coins that need to be consumed when the virtual object 901 is selected, and skill introduction information 906 of the virtual object 901. In this way, it is convenient for the user to check detailed information about a virtual object of interest, and the effectiveness of human-computer interaction in the virtual scene is improved.

In some embodiments, the following processing may also be performed in a virtual scene corresponding to each account: an association button corresponding to each type of virtual object that has been used by the account is displayed in the virtual scene; and the number of virtual objects of an associated type corresponding to a triggered association button that have been used and the total number of virtual objects of the associated type that are allowed to be used are displayed in response to a trigger operation for any one of the at least one association button.

Figure 9B:
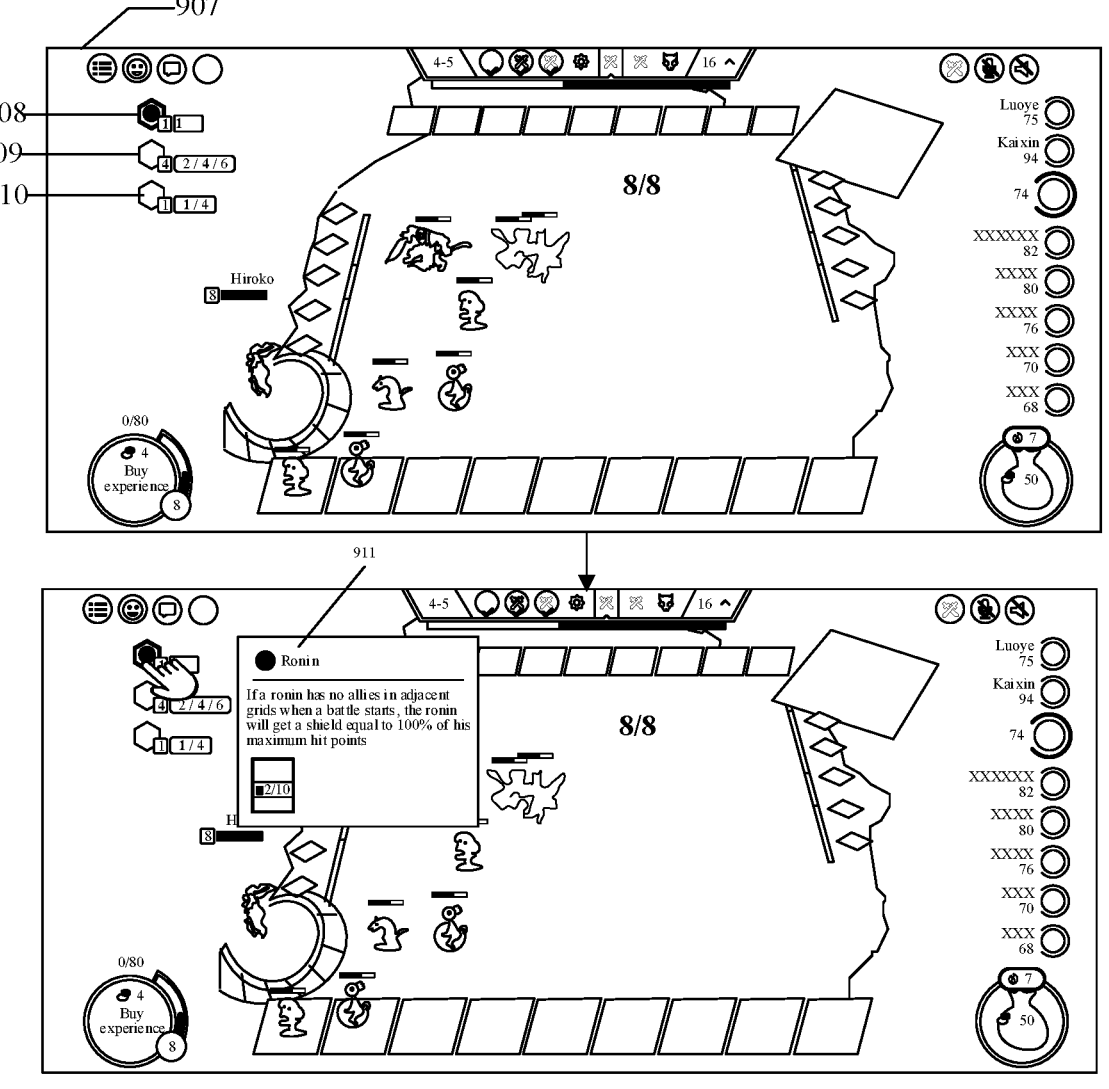

Exemplarily, referring to FIG. 9B that is a schematic diagram of an application scenario of an interaction processing method for a virtual scene according to an embodiment of this application, as shown in FIG. 9B, an association button corresponding to each type of virtual object that has been used by an account (such as account 1) is displayed in a virtual scene 907. For example, the association buttons include an association button 908, an association button 909, and an association button 910, the association button 908 corresponds to virtual object A (such as Northland), the association button 909 corresponds to virtual object B (such as Ranger), and the association button 910 corresponds to virtual object C (such as Fighter). When a click operation of a user for the association button 908 is received, a details interface 911 of a virtual object (such as Ronin having a lineup bond with Fighter) associated with Ranger is displayed, and the number (such as 2) of Ronin that have been currently used and the total number (such as 10) of Ronin that are allowed to be used are displayed in the details interface 911. In this way, it is convenient for the user to check the number of virtual objects associated with a selected virtual object that have been used, and the effectiveness of human-computer interaction in the virtual scene is further improved.

An association relationship will be described below.

Exemplarily, the association relationship may be a bond relationship, which includes a lineup bond, that is, when two game characters of the same lineup appear in the same team, there will be an additional attribute bonus (for example, hit points and attack power of the two game characters will be additionally increased); a couple bond, that is, when two game characters with a couple relationship in a game background story appear in the same team at the same time, there will be an additional attribute bonus (for example, hit points of the two game characters will be additionally increased or skills of the game characters will be enhanced); and a blood bond, that is, when two game characters with a blood relationship in a game background story appear in the same team at the same time, there will be an attribute bonus (for example, hit points or attack power of the two game characters will be additionally increased).

In some other embodiments, the following processing may also be performed for a target account (such as a VIP account, and an account corresponding an auxiliary virtual object with the lowest hit points, that is, an account in a weak position) in the plurality of accounts: a machine learning model is invoked to perform prediction based on environment information (such as a size and a map type) of the virtual scene, types and number of virtual objects used by an interaction account of the target account, a position distribution of virtual objects used by the target account, and a position distribution of the virtual objects used by the interaction account, so as to obtain types of virtual objects that the target account shall use and the selected number of virtual objects of each type, the prediction being performed with the goal of beating the interaction account by the target account; and selection prompt information is displayed in the counter control, the selection prompt information including the types of virtual objects that the target account shall use and the selected number of virtual objects of each type.

Figure 9C:
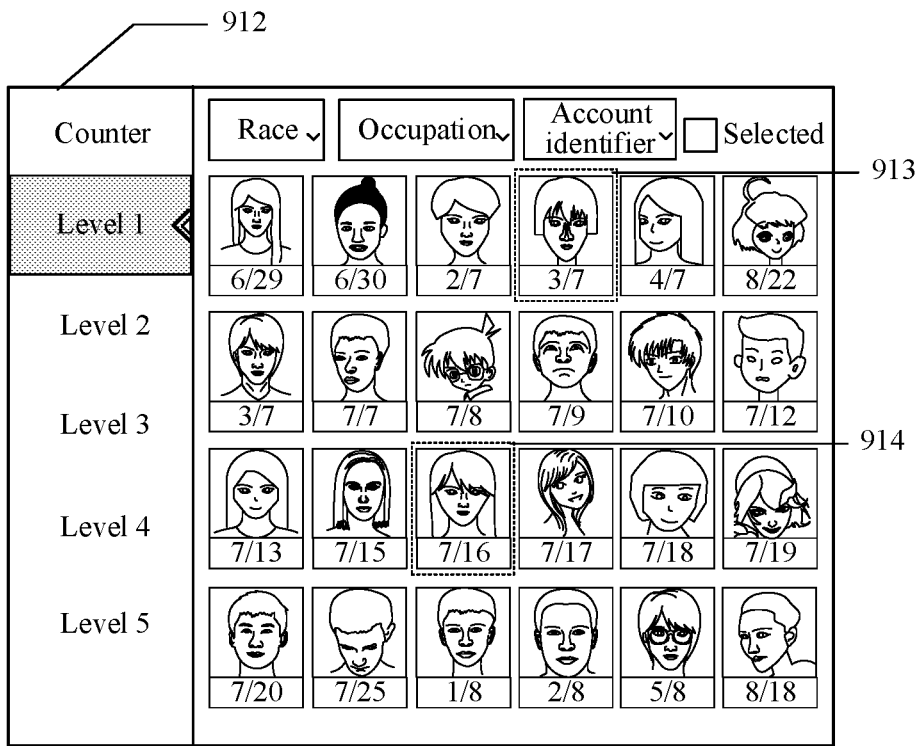

Exemplarily, referring to FIG. 9C that is a schematic diagram of an application scenario of an interaction processing method for a virtual scene according to an embodiment of this application, as shown in FIG. 9C, if the machine learning model is invoked to perform prediction so as to obtain a virtual object 913 and a virtual object 914 that the target account (such as account 1) shall use, the virtual object 913 and the virtual object 914 may be displayed in a specific manner (such as a highlighting manner) in a counter control 912 so as to prompt a user corresponding to account 1 to select the virtual object 913 and the virtual object 914. In this way, by invoking the machine learning model to perform prediction and displaying the corresponding selection prompt information in the counter control, the user decision-making time is reduced, and the effectiveness of human-computer interaction in the virtual scene is further improved.

In some embodiments, before the machine learning model is invoked to perform prediction, the following processing may also be performed: interaction data of a sample winner account and a sample loser account is acquired; an initialized machine learning model is invoked to perform prediction based on an environment (such as a size and a map type) of a sample virtual scene, types and number of virtual objects used by the sample loser account that are included in the interaction data, a position distribution of the virtual objects used by the sample loser account, and a position distribution of virtual objects used by the sample winner account, so as to obtain a prediction result; and a difference between the prediction result and labeled data is determined, back propagation is performed based on the difference, and parameters of the machine learning model are updated layer by layer during the back propagation, the labeled data including types and number of virtual objects used by the sample winner account.

Exemplarily, an exemplary structure of the machine learning model may include: an input layer (that is, an embedding layer), an encoding layer (for example, being composed of a plurality of cascaded convolutional layers), a fully connected layer, and an output layer (including an activation function such as the Softmax function). After being acquired, the interaction data may be first inputted into the input layer for embedding, an embedded feature vector outputted by the input layer is encoded through the encoding layer to obtain a hidden layer feature vector, full connection processing is performed on the hidden layer feature vector through the fully connected layer, and finally a full connection result outputted by the fully connected layer is inputted into the output layer, so that activation is performed through the output layer to obtain a prediction result.

A loss function used in the training process of the machine learning model will be described below.

According to the embodiments of this application, a variety of different types of loss functions may be used to train the machine learning model. For example, the loss functions include a regression loss function, a binary loss function, the hinge loss, a multi-class loss function, and the multi-class cross-entropy loss.

Exemplarily, the multi-class cross-entropy loss is a generalization of the binary cross-entropy loss, and a loss for an input vector $X_i$ and a corresponding one-hot encoded target vector $Y_i$ is:

$$L(X_i, Y_i) = -\sum_{j=1}^{c} y_{ij} * \log(p_{ij}) \qquad (1)$$

where, $p_{ij}$ represents the corresponding probability of an $i^{th}$ input vector in a set j, c represents the total number of input vectors, and $y_{ij}$ represents an output corresponding to the $i^{th}$ input vector.

Exemplarily, the Hinge loss is mainly used for a support vector machine with class labels (for example, including 1 and 0, 1 representing victory and 0 representing failure). For example, a formula for calculating the Hinge loss of a data pair (x, y) is as follows:

$$L=\max(0, 1-y*f(x)) \qquad (2)$$

where, y represents a real value, f(x) represents a predicted value, and the Hinge loss simplifies the mathematical operation of the support vector machine while maximizing the loss.

The foregoing machine learning model may be a neural network model (such as a convolutional neural network, a deep convolutional neural network, and a fully connected neural network), a decision tree model, a gradient-boosted tree, a multi-layer perceptron, a support vector machine, or the like, and the type of the machine learning model is not defined herein.

According to the interaction processing method for a virtual scene provided by the embodiments of this application, the counter button is displayed; and the counter control is displayed when the trigger operation on the counter button is received, the counter control including the number of virtual objects of each type that have been used and the total number of virtual objects of each type that are allowed to be used. In this way, a user may check the number of virtual objects of each type that have been used and the total number of virtual objects of each type that are allowed to be used in the virtual scene at one time, the time that the user needs to make a decision is reduced, the interaction process is and accelerated, and the waiting time and resource consumption of a server are reduced.

An exemplary application of the embodiments of this application in a practical application scenario will be described below.

In a multi-player battle strategy game (such as an Auto Chess game), a user needs to simultaneously check and remember information about the number and types of chess pieces (corresponding to the foregoing virtual objects) in chess boards of other users participating in the same game, and needs more calculation and memory to obtain the number of chess pieces of each type that have been currently used. If the user spends more time here, the time for the user to perform other operations and make decisions in the game round will be reduced, which will result in a time-pressured situation and result in a situation where the user is unable to complete all target operations within the specified time.

In view of this, the embodiments of this application provide an interaction processing method for a virtual scene, which may provide a user with a more efficient way to check information about the number and types of chess pieces that have been used, enable the user to grasp and calculate the situation of the remaining chess pieces in the existing store, and provide a strong reference for the user to make a decision. In this way, an interaction process in a game can be accelerated, and the waiting time and resource consumption of a server are reduced.

Figure 10:
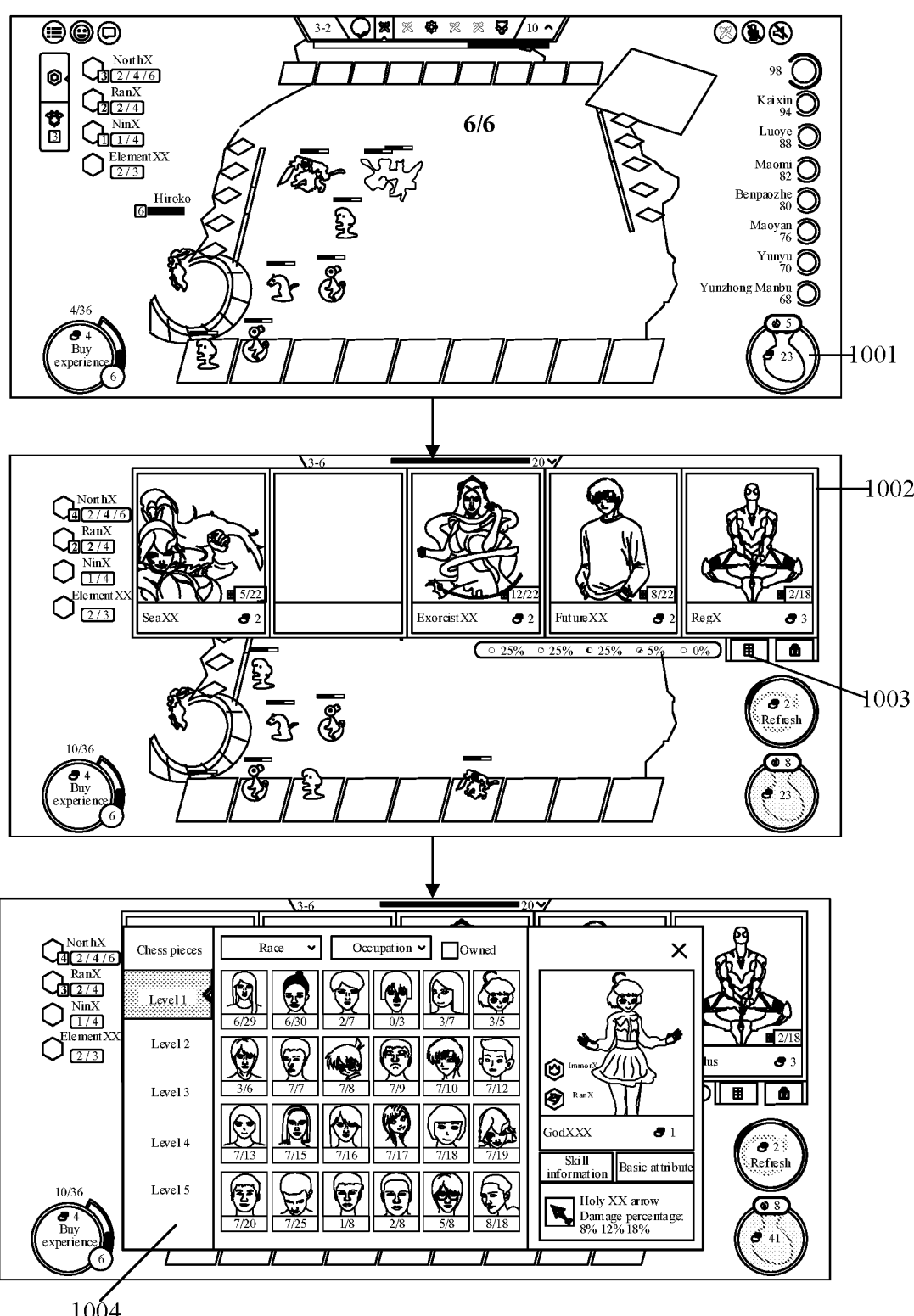
FIG. 10 is a schematic diagram of an application scenario of an interaction processing method for a virtual scene according to an embodiment of this application.

Exemplarily, referring to FIG. 10 that is schematic diagram of an application scenario of an interaction processing method for a virtual scene according to an embodiment of this application, as shown in FIG. 10, when a click operation of a user for a store entry 1001 is received, a store control 1002 is displayed, and a chess piece counter button 1003 is displayed in the store control 1002. When a click operation of the user for the chess piece counter button 1003 is received, a chess piece counter control 1004 is displayed, and the number of chess pieces of each type that have been used in a game and the total number of chess pieces of each type that are allowed to be used in the game are displayed in the chess piece counter control 1004.

Figure 11:
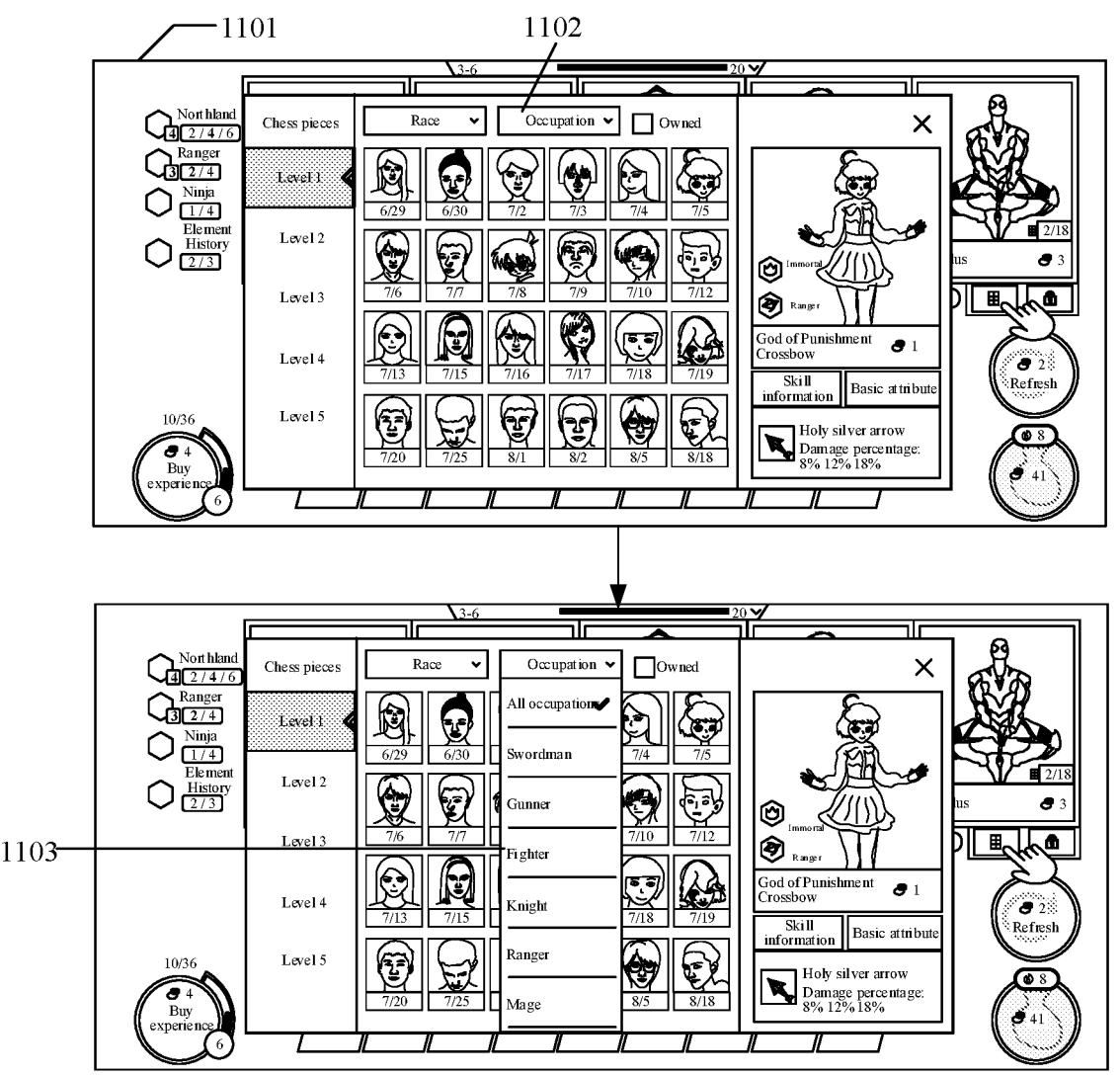
FIG. 11 is a schematic diagram of an application scenario of an interaction processing method for a virtual scene according to an embodiment of this application.

Exemplarily, referring to FIG. 11 that is a schematic diagram of an application scenario of an interaction processing method for a virtual scene according to an embodiment of this application, as shown in FIG. 11, a user may filter chess pieces according to stars, races, occupations, selection statuses, and the like through a navigation bar. For example, when a click operation of the user for an occupation button 1102 is received, an occupation list 1103 is displayed, which including all occupations, swordsman, gunner, fighter, knight, ranger, and mage. When the user selects fighters in the occupation list 1103, information about the number of chess pieces corresponding to fighters will be updated and displayed in the chess piece counter control 1101, that is, the number of chess pieces of each type corresponding to fighters that have been currently used and the total number of chess pieces that are allowed to be used are displayed in the chess piece counter control 1101.

Figure 12:
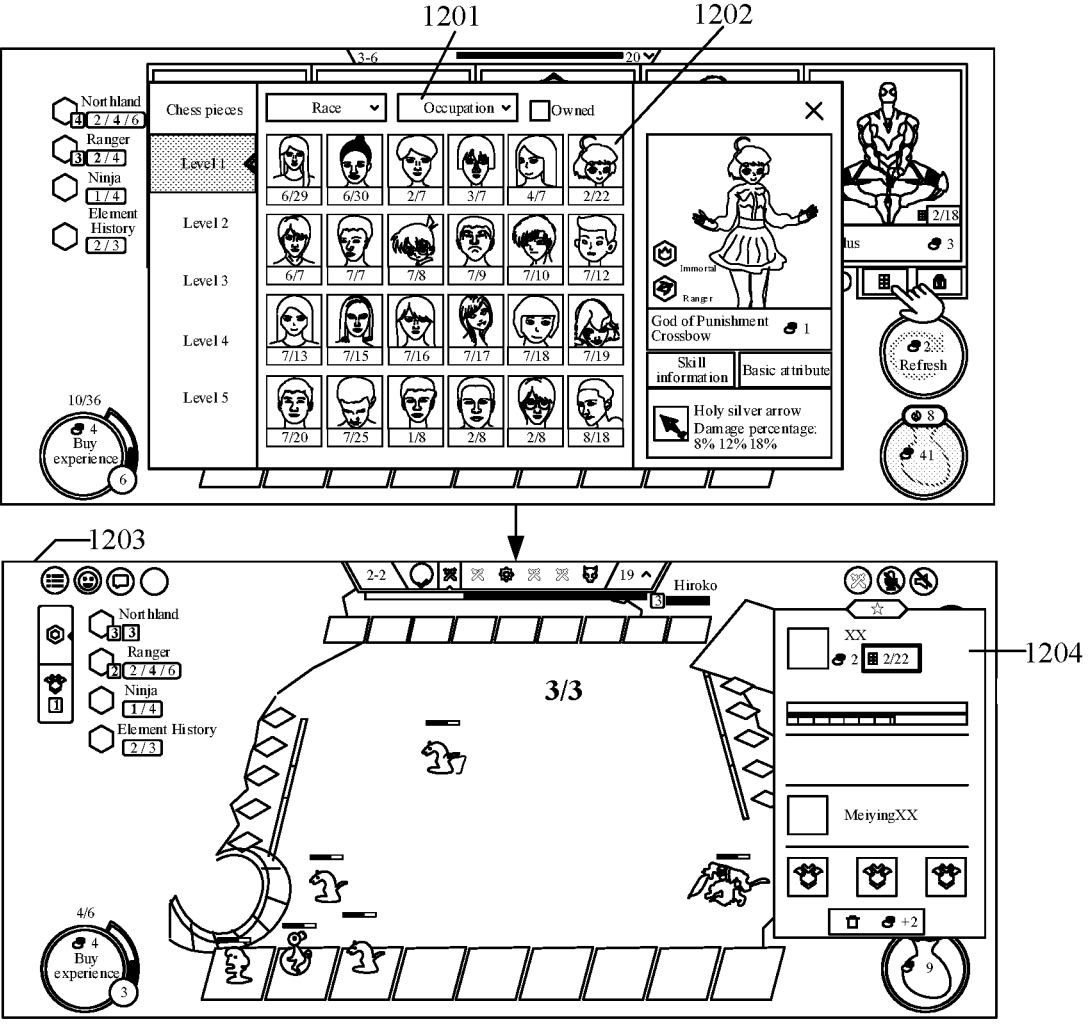
FIG. 12 is a schematic diagram of an application scenario of an interaction processing method for a virtual scene according to an embodiment of this application.

Exemplarily, referring to FIG. 12 that is a schematic diagram of an application scenario of an interaction processing method for a virtual scene according to an embodiment of this application, as shown in FIG. 12, when a click operation of a user for a chess piece 1202 displayed in a chess piece counter control 1201 is received, a chessboard interface 1203 is displayed, a details page 1204 of the chess piece 1202 is displayed in the chessboard interface 1203, and the number of chess pieces 1202 that have been currently used, the total number of chess pieces 1202 that are allowed to be used, skills possessed by the chess piece 1202, and the like are displayed in the details page 1204.

Figure 13:
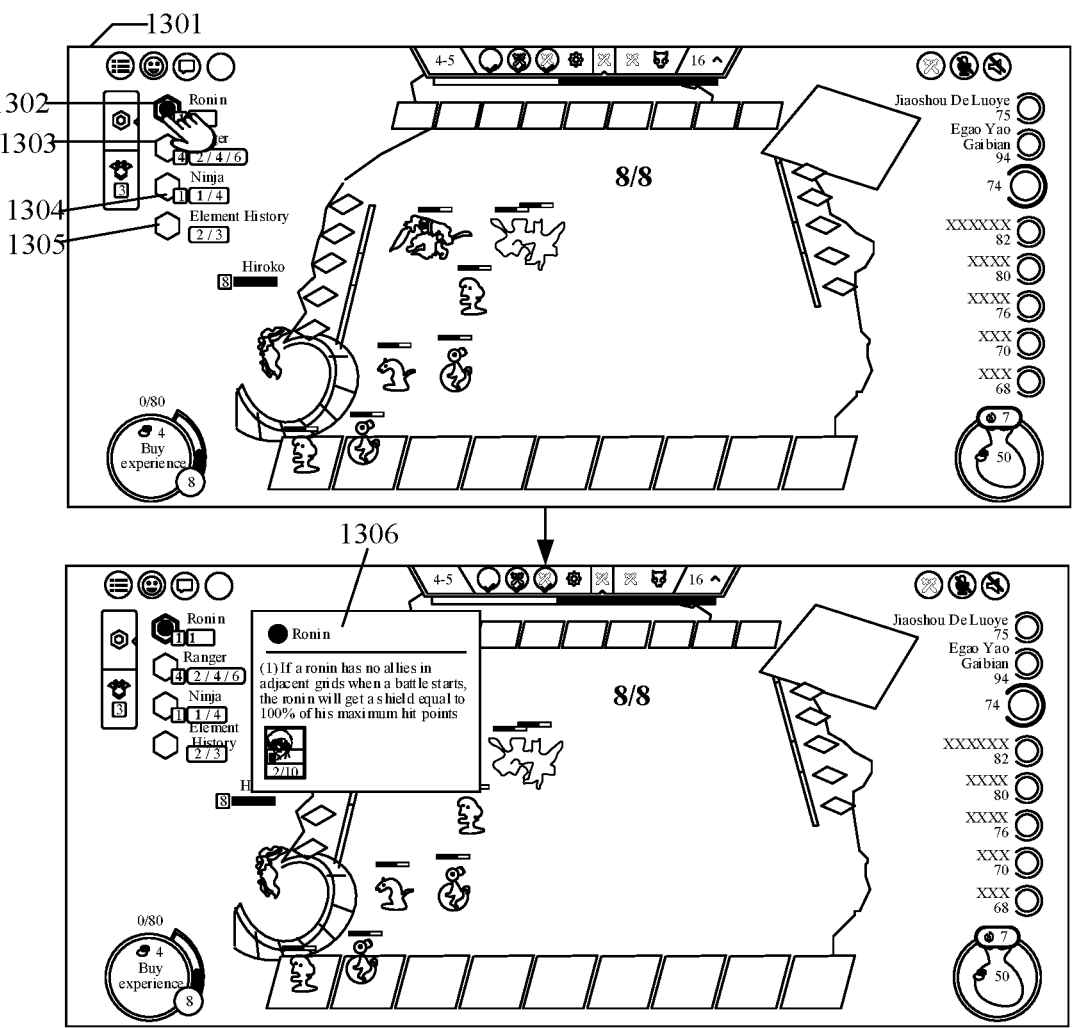
FIG. 13 is a schematic diagram of an application scenario of an interaction processing method for a virtual scene according to an embodiment of this application.

Exemplarily, referring to FIG. 13 that is a schematic diagram of an application scenario of an interaction processing method for a virtual scene according to an embodiment of this application, as shown in FIG. 13, a plurality of bond buttons (corresponding to the foregoing association buttons) are displayed in a chessboard interface 1301. For example, the bond buttons include a bond button 1302, a bond button 1303, a bond button 1304, and a bond button 1305. When a click operation of a user for the bond button 1302 is received, a details interface 1306 of a chess piece belonging to the bond is displayed, and the number of chess pieces (such as Ronin) belonging to the bond that have been currently used and the total number of chess pieces that are allowed to be used are displayed in the details interface 1306.

Figure 14:
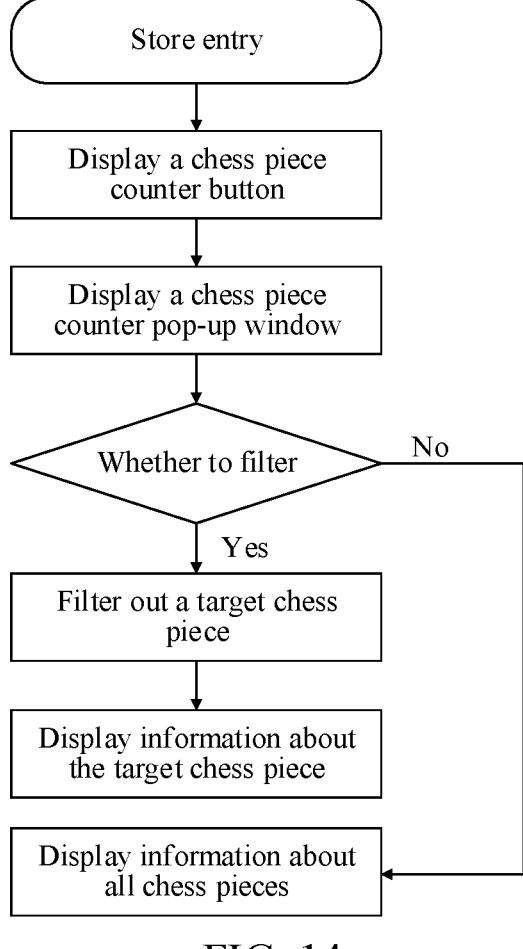
FIG. 14 is a schematic flowchart of an interaction processing method for a virtual scene according to an embodiment of this application.

Exemplarily, referring to FIG. 14 that is a schematic flowchart of an interaction processing method for a virtual scene according to an embodiment of this application, as shown in FIG. 14, when a click operation of a user for a store entry is received, a store control is displayed (for example, a store interface popped in a chessboard interface), and when a click operation of the user for a chess piece counter button displayed in the store control is received, a chess piece counter control is displayed (for example, a chess piece counter pop-up window is popped in the store interface). When a filter operation of the user for a navigation bar displayed in the chess piece counter control is received (for example, the user clicks on a "filter" pull-down button and clicks target chess piece type information), a client filters out target chess pieces according to a chess piece type selected by the user, and displays information about the number of target chess pieces in the chess piece counter pop-up window. When the user does not perform filtering, information about the number of all chess pieces is displayed in the chess piece counter pop-up window for the user to check.

According to the interaction processing method for a virtual scene provided by the embodiments of this application, the problem that it is tedious for a user to check information about the number and types of chess pieces in a multi-player battle strategy game (such as an Auto Chess game) may be better solved. The chess piece counter mechanism allows the user to quickly check the number of chess pieces that have been used and the total number of chess pieces that are allowed to be used, which reduces the counting time, provides a strong reference for the user to make a decision, improves the effectiveness of human-computer interaction in the virtual scene, and also improves the user's use experience.

An exemplary structure of an interaction processing apparatus 465 for a virtual scene according to the embodiments of this application that is implemented as a software module will be described blow. In some embodiments, as shown in FIG. 3, the software module in the interaction processing apparatus 465 for a virtual scene that is stored in the memory 460 may include: a display module 4651.

The display module 4651 is configured to display a virtual scene, the virtual scene including identifiers of a plurality of accounts, and each account being capable of controlling at least one virtual object to interact with at least one virtual object controlled by another account. The display module 4651 is further configured to display a counter button. The display module 4651 is further configured to display a counter control in response to a trigger operation on the counter button, the counter control including the number of virtual objects of each type that have been used and the total number of virtual objects of each type that are allowed to be used.

In some embodiments, the display module 4651 is further configured to display a store entry; and display a store control in response to a trigger operation for the store entry, the store control including a plurality of different types of virtual objects that are allowed to be used, and perform the operation of displaying a counter button.

In some embodiments, the display module 4651 is further configured to update and display, in response to an index selection operation, the number of target virtual objects of at least one type corresponding to a selected filter parameter that have been used and the total number of target virtual objects of each type that are allowed to be used in the counter control.

In some embodiments, the display module 4651 is further configured to display a plurality of levels in the counter control; and update and display, in response to a level selection operation, the number of target virtual objects of at least one type corresponding to a selected level that have been used and the total number of target virtual objects of each type that are allowed to be used in the counter control.

In some embodiments, the display module 4651 is further configured to display a race button in the counter control;

display a race list in response to a trigger operation for the race button; and update and display, in response to a selection operation for the race list, the number of target virtual objects of at least one type corresponding to a selected race that have been used and the total number of target virtual objects of each type that are allowed to be used in the counter control.

In some embodiments, the display module 4651 is further configured to display an occupation button in the counter control; display an occupation list in response to a trigger operation for the occupation button; and update and display, in response to a selection operation for the occupation list, the number of target virtual objects of at least one type corresponding to a selected occupation that have been used and the total number of target virtual objects of each type that are allowed to be used in the counter control.

In some embodiments, the display module 4651 is further configured to perform the following processing in a virtual scene corresponding to each account: display a "selected" selection button in the counter control; and update and display, in response to a selection operation for the selection button, the number of target virtual objects of at least one type that have been selected and used by the account and the total number of target virtual objects of each type that are allowed to be used in the counter control.

In some embodiments, the display module 4651 is further configured to display an account identifier button in the counter control; display, in response to a trigger operation for the account identifier button, an identifier list, the identifier list including a plurality of identifiers corresponding to the plurality of accounts in a one-to-one manner; and update and display, in response to a selection operation for the identifier list, the number of target virtual objects of at least one type corresponding to a selected identifier that have been used and the total number of target virtual objects of each type that are allowed to be used in the counter control.

In some embodiments, the display module 4651 is further configured to display detailed information about any type of virtual object in response to a trigger operation for any type of virtual object displayed in the counter control, the detailed information including the number of virtual objects of any type that have been used, the total number of virtual objects of any type that are allowed to be used, and attribute information of any type of virtual object.

In some embodiments, the display module 4651 is further configured to perform the following processing in a virtual scene corresponding to each account: display an association button corresponding to each type of virtual object that has been used by the account in the virtual scene; and display, in response to a trigger operation for any one of the at least one association button, the number of virtual objects of an associated type corresponding to a triggered association button that have been used and the total number of virtual objects of the associated type that are allowed to be used.

In some embodiments, the interaction processing apparatus 465 for a virtual scene further includes a prediction module 4652 configured to perform the following processing for a target account in the plurality of accounts: invoke a machine learning model to perform prediction based on environment information of the virtual scene, types and number of virtual objects used by an interaction account of the target account, a position distribution of virtual objects used by the target account, and a position distribution of the virtual objects used by the interaction account, so as to obtain types of virtual objects that the target account shall use and the selected number of virtual objects of each type, the prediction being performed with the goal of beating the interaction account by the target account; and the display module 4651 is further configured to display selection prompt information in the counter control, the selection prompt information including the types of virtual objects that the target account shall use and the selected number of virtual objects of each type.

In some embodiments, the interaction processing apparatus 465 for virtual scene further includes a training module 4653 configured to acquire interaction data of a sample winner account and a sample loser account; invoke an initialized machine learning model to perform prediction based on an environment of a sample virtual scene, types and number of virtual objects controlled by the sample loser account that are included in the interaction data, a position distribution of the virtual objects controlled by the sample loser account, and a position distribution of virtual objects controlled by the sample winner account, so as to obtain a prediction result; and determine a difference between the prediction result and labeled data, perform back propagation based on the difference, and update parameters of the machine learning model layer by layer during the back propagation, the labeled data including types and number of virtual objects controlled by the sample winner account.

In some embodiments, the interaction processing apparatus 465 for a virtual scene further includes a determination module 4654 configured to perform the following processing for a target account in the plurality of accounts: determine a selected account as an interaction account of the target account in response to a selection operation for the plurality of accounts; or automatically select an account from the plurality of accounts as an interaction account of the target account, a selection method including any one of the following: random selection, and selection of an account that has an interaction parameter difference with the target account being less than a threshold value; and the display module 4651 is further configured to display the counter control in response to a trigger operation on the counter button, the counter control including the number of virtual objects of each type that have been used by the interaction account and the total number of virtual objects of each type that are allowed to be used.

In some embodiments, the display module 4651 is further configured to perform the following processing for each interaction: display the counter button in an interaction area of the virtual scene before the interaction starts; and hide the counter button in the interaction area of the virtual scene when the interaction starts.

The description of the apparatus in the embodiments of this application is similar to the foregoing implementation of the interaction processing method for a virtual scene, and has similar beneficial effects, so the description will not be repeated. Undescribed technical details of the interaction processing apparatus for a virtual scene according to the embodiments of this application may be understood according to the description of any one of FIG. 4, FIG. 6, and FIG. 8.

The embodiments of this application provide a computer program product or computer program, which includes a computer instruction (that is, an executable instruction). The computer instruction is stored in a non-transitory computer-readable storage medium. A processor of an electronic device reads the computer instruction from the computer-readable storage medium and executes the computer instruction to cause the electronic device to perform the foregoing interaction processing method for a virtual scene in the embodiments of this application.

Figure 6:
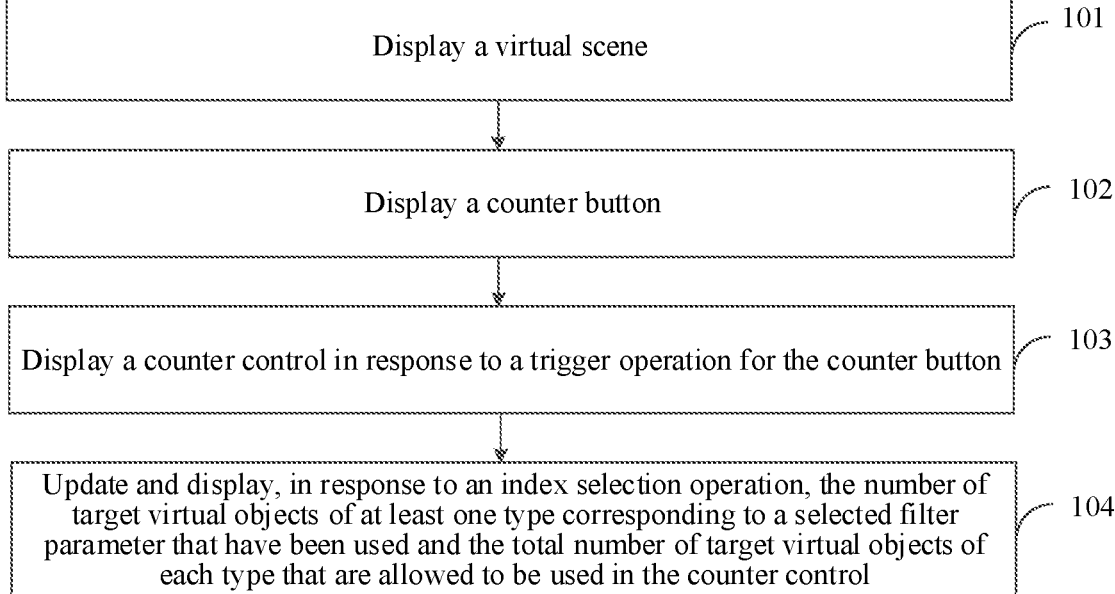
FIG. 6 is a schematic flowchart of an interaction processing method for a virtual scene according to an embodiment of this application.

The embodiments of this application provide a non-transitory computer-readable storage medium, which stores an executable instruction that, when executed by a processor, causes the processor to perform the method according to the embodiments of this application, such as the interaction processing method for a virtual scene shown in FIG. 4, FIG. 6 or FIG. 8.

In some embodiments, the computer-readable storage medium may be a memory such as a ferroelectric random access memory (FRAM), a read-only memory (ROM), a programmable read-only memory (PROM), an erasable programmable read-only memory (EPROM), an electrically erasable programmable read-only memory (EEPROM), a flash memory, a magnetic surface memory, an optical disk, and a compact disc read-only memory (CD-ROM); or may be various devices including one or any combination of the foregoing memories.

In some embodiments, the executable instruction may be in the form of a program, software, a software module, a script, or a code that is written in any form of programming language (including compiled or interpreted languages, or declarative or procedural languages), and may be deployed in any form, including a stand-alone program, or a module, a component, a subroutine or other units suitable for use in a computing environment. In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

Exemplarily, the executable instruction may, but does not necessarily, correspond to a file in a file system, may be stored in a portion of a file that stores other programs or data, for example, stored in one or more scripts in a HyperText Markup Language (HTML) document, stored in a single file dedicated to the discussed program, or stored in multiple collaborative files (such as files that store one or more modules, subprograms, or code portions).

Exemplarily, the executable instruction may be deployed to be executed on an electronic device, or on multiple electronic devices located at one site, or on multiple electronic devices distributed across multiple sites and interconnected through a communication network.

The above are merely embodiments of this application and are not intended to limit the scope of protection of this application. Any modification, equivalent replacement, and improvement made without departing from the spirit and scope of this application shall fall within the scope of protection of this application.

What is claimed is:

1. An interaction processing method for a virtual scene performed by an electronic device, the method comprising:
  displaying a virtual scene, the virtual scene comprising identifiers of a plurality of accounts, and each account being capable of controlling at least one virtual object to interact with at least one virtual object controlled by another account;
  displaying a counter button overlaying the virtual scene;
  receiving a trigger operation on the counter button by a user of the electronic device;

in response to the trigger operation on the counter button, generating a counter control in the virtual scene, the counter control comprising:

a number of virtual objects of each type that have been used and a total number of virtual objects of the type that are allowed to be used; and at least one filter index for the virtual objects:

receiving an index selection operation associated with the at least one filter index by the user of the electronic device; and in response to the index selection operation, updating the counter control in the virtual scene by displaying a number of target virtual objects of each type corresponding to a selected filter parameter associated with the at least one filter index that have been used and the total number of target virtual objects of the type that are allowed to be used.

2. The method according to claim 1, wherein the method further comprises:

before displaying the counter button:

displaying a store entry; and displaying a store control in response to a trigger operation for the store entry, the store control comprising a plurality of different types of virtual objects that are allowed to be used, and performing the operation of displaying a counter button.

3. The method according to claim 1, wherein a type of the filter index comprises: levels, races, occupations, selection statuses, and account identifiers.

4. The method according to claim 1, further comprising:

displaying detailed information about any type of virtual object in response to a trigger operation for any type of virtual object displayed in the counter control, the detailed information comprising the number of virtual objects of any type that have been used, the total number of virtual objects of any type that are allowed to be used, and attribute information of any type of virtual object.

5. The method according to claim 1, further comprising:

performing the following processing in a virtual scene corresponding to each account:

displaying at least one association button corresponding to each type of virtual object that has been used by the account in the virtual scene; and displaying, in response to a trigger operation for any one of the at least one association button, the number of virtual objects of an associated type corresponding to a triggered association button that have been used and the total number of virtual objects of the associated type that are allowed to be used.

6. The method according to claim 1, further comprising:

performing the following processing for a target account in the plurality of accounts:

invoking a machine learning model to perform prediction based on environment information about the virtual scene, types and number of virtual objects controlled by an interaction account of the target account, a position distribution of virtual objects controlled by the target account, and a position distribution of the virtual objects controlled by the interaction account, so as to obtain types of virtual objects that the target account shall control and a selected number of virtual objects of each type, the prediction being performed with a goal of beating the interaction account by the target account; and displaying selection prompt information in the counter control, the selection prompt information comprising the types of virtual objects that the target account shall use and the selected number of virtual objects of each type.

7. The method according to claim 1, further comprising:

performing the following processing for a target account in the plurality of accounts:

determining a selected account as an interaction account of the target account in response to a selection operation for the plurality of accounts; or automatically selecting an account from the plurality of accounts as an interaction account of the target account, a selection method comprising any one of the following: random selection, and selection of an account that has an interaction parameter difference with the target account being less than a threshold value; and the displaying a counter control in response to a trigger operation on the counter button comprising:

displaying the counter control in response to the trigger operation on the counter button, the counter control comprising the number of virtual objects of each type that have been used by the interaction account and the total number of virtual objects of each type that are allowed to be used.

8. An electronic device, comprising:

a processor, a memory, and an executable instruction stored in the memory; and the executable instruction stored in the memory, when executed by the processor, causing the electronic device to perform an interaction processing method for a virtual scene including:

displaying a virtual scene, the virtual scene comprising identifiers of a plurality of accounts, and each account being capable of controlling at least one virtual object to interact with at least one virtual object controlled by another account;

displaying a counter button overlaying the virtual scene;

receiving a trigger operation on the counter button by a user of the electronic device;

in response to the trigger operation on the counter button, generating a counter control in the virtual scene, the counter control comprising:

a number of virtual objects of each type that have been used and a total number of virtual objects of the type that are allowed to be used; and at least one filter index for the virtual objects:

receiving an index selection operation associated with the at least one filter index by the user of the electronic device; and in response to the index selection operation, updating the counter control in the virtual scene by displaying a number of target virtual objects of each type corresponding to a selected filter parameter associated with the at least one filter index that have been used and the total number of target virtual objects of the type that are allowed to be used.

9. The electronic device according to claim 8, wherein the method further comprises:

before displaying the counter button:

displaying a store entry; and displaying a store control in response to a trigger operation for the store entry, the store control comprising a plurality of different types of virtual objects that are allowed to be used, and performing the operation of displaying a counter button.

10. The electronic device according to claim 8, wherein a type of the filter index comprises: levels, races, occupations, selection statuses, and account identifiers.

11. The electronic device according to claim 8, wherein the method further comprises:

displaying detailed information about any type of virtual object in response to a trigger operation for any type of virtual object displayed in the counter control, the detailed information comprising the number of virtual objects of any type that have been used, the total number of virtual objects of any type that are allowed to be used, and attribute information of any type of virtual object.

12. The electronic device according to claim 8, wherein the method further comprises:

performing the following processing in a virtual scene corresponding to each account:

displaying at least one association button corresponding to each type of virtual object that has been used by the account in the virtual scene; and displaying, in response to a trigger operation for any one of the at least one association button, the number of virtual objects of an associated type corresponding to a triggered association button that have been used and the total number of virtual objects of the associated type that are allowed to be used.

13. The electronic device according to claim 8, wherein the method further comprises:

performing the following processing for a target account in the plurality of accounts:

invoking a machine learning model to perform prediction based on environment information about the virtual scene, types and number of virtual objects controlled by an interaction account of the target account, a position distribution of virtual objects controlled by the target account, and a position distribution of the virtual objects controlled by the interaction account, so as to obtain types of virtual objects that the target account shall control and a selected number of virtual objects of each type, the prediction being performed with a goal of beating the interaction account by the target account; and displaying selection prompt information in the counter control, the selection prompt information comprising the types of virtual objects that the target account shall use and the selected number of virtual objects of each type.

14. The electronic device according to claim 8, wherein the method further comprises:

performing the following processing for a target account in the plurality of accounts:

determining a selected account as an interaction account of the target account in response to a selection operation for the plurality of accounts; or automatically selecting an account from the plurality of accounts as an interaction account of the target account, a selection method comprising any one of the following: random selection, and selection of an account that has an interaction parameter difference with the target account being less than a threshold value; and the displaying a counter control in response to a trigger operation on the counter button comprising:

displaying the counter control in response to the trigger operation on the counter button, the counter control comprising the number of virtual objects of each type that have been used by the interaction account and the total number of virtual objects of each type that are allowed to be used.

15. A non-transitory computer-readable storage medium, storing an executable instruction that, when executed by a processor of an electronic device, causes the electronic device to implement an interaction processing method for a virtual scene including:

displaying a virtual scene, the virtual scene comprising identifiers of a plurality of accounts, and each account being capable of controlling at least one virtual object to interact with at least one virtual object controlled by another account;

displaying a counter button overlaying the virtual scene;

receiving a trigger operation on the counter button by a user of the electronic device: in response to the trigger operation on the counter button, generating a counter control in the virtual scene, the counter control comprising:

a number of virtual objects of each type that have been used and a total number of virtual objects of the type that are allowed to be used; and at least one filter index for the virtual objects:

receiving an index selection operation associated with the at least one filter index by the user of the electronic device; and in response to the index selection operation, updating the counter control in the virtual scene by displaying a number of target virtual objects of each type corresponding to a selected filter parameter associated with the at least one filter index that have been used and the total number of target virtual objects of the type that are allowed to be used.

16. The non-transitory computer-readable storage medium according to claim 15, wherein a type of the filter index comprises: levels, races, occupations, selection statuses, and account identifiers.

17. The non-transitory computer-readable storage medium according to claim 15, wherein the method further comprises:

displaying detailed information about any type of virtual object in response to a trigger operation for any type of virtual object displayed in the counter control, the detailed information comprising the number of virtual objects of any type that have been used, the total number of virtual objects of any type that are allowed to be used, and attribute information of any type of virtual object.

18. The non-transitory computer-readable storage medium according to claim 15, wherein the method further comprises:

performing the following processing in a virtual scene corresponding to each account:

displaying at least one association button corresponding to each type of virtual object that has been used by the account in the virtual scene; and displaying, in response to a trigger operation for any one of the at least one association button, the number of virtual objects of an associated type corresponding to a triggered association button that have been used and the total number of virtual objects of the associated type that are allowed to be used.

19. The non-transitory computer-readable storage medium according to claim 15, wherein the method further comprises:

performing the following processing for a target account in the plurality of accounts:

invoking a machine learning model to perform prediction based on environment information about the virtual scene, types and number of virtual objects controlled by an interaction account of the target account, a position distribution of virtual objects controlled by the target account, and a position distribution of the virtual objects controlled by the interaction account, so as to obtain types of virtual objects that the target account shall control and a selected number of virtual objects of each type, the prediction being performed with a goal of beating the interaction account by the target account; and displaying selection prompt information in the counter control, the selection prompt information comprising the types of virtual objects that the target account shall use and the selected number of virtual objects of each type.

20. The non-transitory computer-readable storage medium according to claim 15, wherein the method further comprises:

performing the following processing for a target account in the plurality of accounts:

determining a selected account as an interaction account of the target account in response to a selection operation for the plurality of accounts; or automatically selecting an account from the plurality of accounts as an interaction account of the target account, a selection method comprising any one of the following: random selection, and selection of an account that has an interaction parameter difference with the target account being less than a threshold value; and the displaying a counter control in response to a trigger operation on the counter button comprising:

displaying the counter control in response to the trigger operation on the counter button, the counter control comprising the number of virtual objects of each type that have been used by the interaction account and the total number of virtual objects of each type that are allowed to be used.

\* \* \* \* \*